(12) United States Patent
Isei et al.

(10) Patent No.: US 10,598,481 B2
(45) Date of Patent: Mar. 24, 2020

(54) CRANKSHAFT SHAPE INSPECTION APPARATUS, SYSTEM AND METHOD

(71) Applicant: NIPPON STEEL & SUMITOMO METAL CORPORATION, Tokyo (JP)

(72) Inventors: Yoshito Isei, Tokyo (JP); Toshiyuki Oyama, Tokyo (JP); Ryota Ohashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/083,778

(22) PCT Filed: Mar. 13, 2017

(86) PCT No.: PCT/JP2017/010008
§ 371 (c)(1),
(2) Date: Sep. 10, 2018

(87) PCT Pub. No.: WO2017/159626
PCT Pub. Date: Sep. 21, 2017

(65) Prior Publication Data
US 2019/0128663 A1 May 2, 2019

(30) Foreign Application Priority Data
Mar. 15, 2016 (JP) .................. 2016-051115

(51) Int. Cl.
*G01B 11/24* (2006.01)
*G01M 1/02* (2006.01)
(Continued)

(52) U.S. Cl.
CPC .............. *G01B 11/24* (2013.01); *G01B 21/02* (2013.01); *G01B 21/10* (2013.01); *G01M 1/02* (2013.01); *G01B 9/02015* (2013.01)

(58) Field of Classification Search
CPC ........ G01B 11/24; G01B 21/02; G01B 21/10; G01B 9/02015; G01M 1/02
See application file for complete search history.

(56) References Cited

U.S. PATENT DOCUMENTS

| 4,884,210 A | 11/1989 | Blaimschein |
| 2011/0071806 A1 | 3/2011 | Yoshimoto |

(Continued)

FOREIGN PATENT DOCUMENTS

| EP | 2184595 A1 | 5/2010 |
| EP | 2713139 A1 | 4/2014 |

(Continued)

OTHER PUBLICATIONS

International Preliminary Report on Patentability and English translation of the Written Opinion of the International Searching Authority (Forms PCT/IB/373 and PCT/ISA/237) for International Application No. PCT/JP2017/010008, dated Sep. 27, 2018.

(Continued)

*Primary Examiner* — Jamil Ahmed
(74) *Attorney, Agent, or Firm* — Birch, Stewart, Kolasch & Birch, LLP

(57) ABSTRACT

Around a crankshaft (S) supported by a support device (10), a first shape measuring device (31) to a fourth shape measuring device (34) are disposed, and the crankshaft (S) and the first shape measuring device (31) to the fourth shape measuring device (34) are relatively movable in an axial direction (X direction) of the crankshaft (S). The first shape measuring device (31) and the third shape measuring device (33) are disposed so as to face to one X direction and acquire partial shape information (including the other side surfaces in the X direction of counterweights (S2)) of the crankshaft S, and further, the second shape measuring device (32) and the fourth shape measuring device (34) are disposed so as to face to the other X direction and acquire partial shape (Continued)

information (including one side surfaces in the X direction of the counterweights (S2)) of the crankshaft S. This makes it possible to accurately inspect a shape of the crankshaft (S) in a short time.

13 Claims, 27 Drawing Sheets

(51) Int. Cl.
*G01B 21/10* (2006.01)
*G01B 21/02* (2006.01)
*G01B 9/02* (2006.01)

(56) References Cited

U.S. PATENT DOCUMENTS

| | | |
|---|---|---|
| 2014/0130561 A1 | 5/2014 | Nolten et al. |
| 2015/0060003 A1* | 3/2015 | Murrish .................. B22C 9/103 164/129 |
| 2015/0346048 A1 | 12/2015 | Rogalla |
| 2018/0172436 A1 | 6/2018 | Isei et al. |

FOREIGN PATENT DOCUMENTS

| | | |
|---|---|---|
| JP | 3-296607 A | 12/1991 |
| JP | 6-265334 A | 9/1994 |
| JP | 10-62144 A | 3/1998 |
| JP | 10-68607 A | 3/1998 |
| JP | 2007-212357 A | 8/2007 |
| JP | 2008-164491 A | 7/2008 |
| JP | 2009-20009 A | 1/2009 |
| JP | 2009-168744 A | 7/2009 |
| JP | 2010-31987 A | 2/2010 |
| JP | 2010-217083 A | 9/2010 |
| WO | WO 02/42714 A1 | 5/2002 |
| WO | WO 2016/194728 A1 | 12/2016 |

OTHER PUBLICATIONS

International Search Report for PCT/JP2017/010008 (PCT/ISA/210) dated May 30, 2017.
Written Opinion of the International Searching Authority for PCT/JP2017/010008 (PCT/ISA/237) dated May 30, 2017.
Extended European Search Report for European Application No. 17766626.0, dated Sep. 19, 2019.
Röhrle, "Laser measruing machine for rotary parts," MTZ—Motortechnische Zeitschrift, published by Springer, vol. 65, No. 1, Jan. 1, 2004, XP001196422, pp. 44-45 (6 pages total) with English translation.

\* cited by examiner

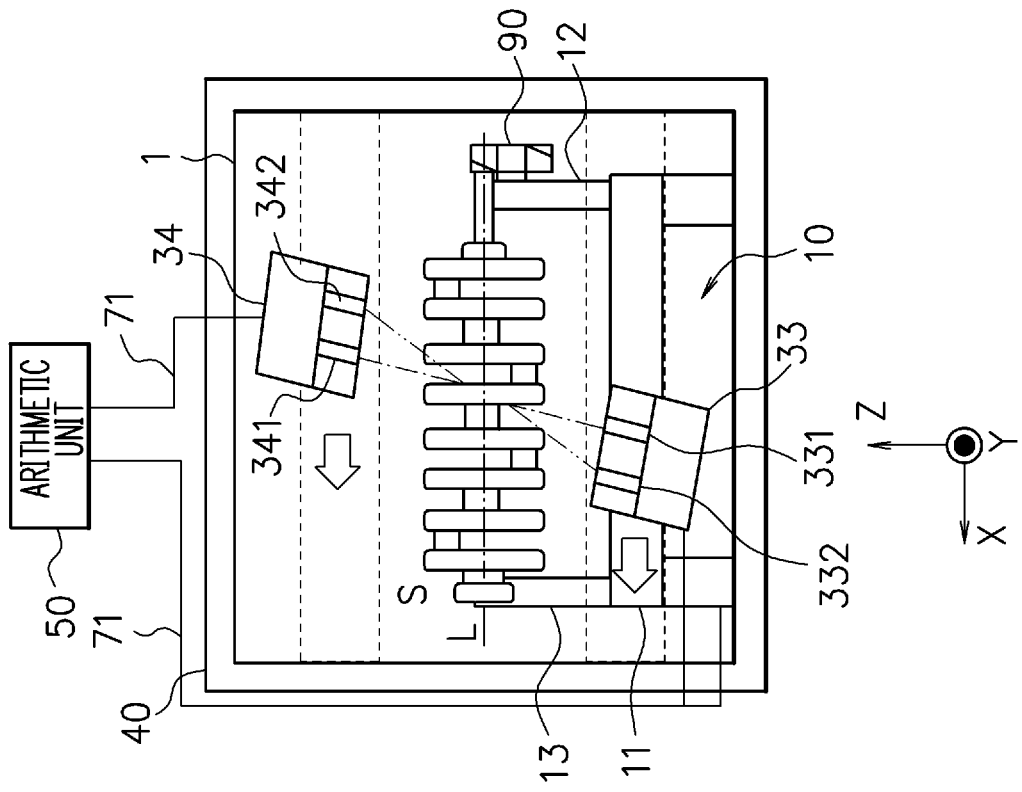
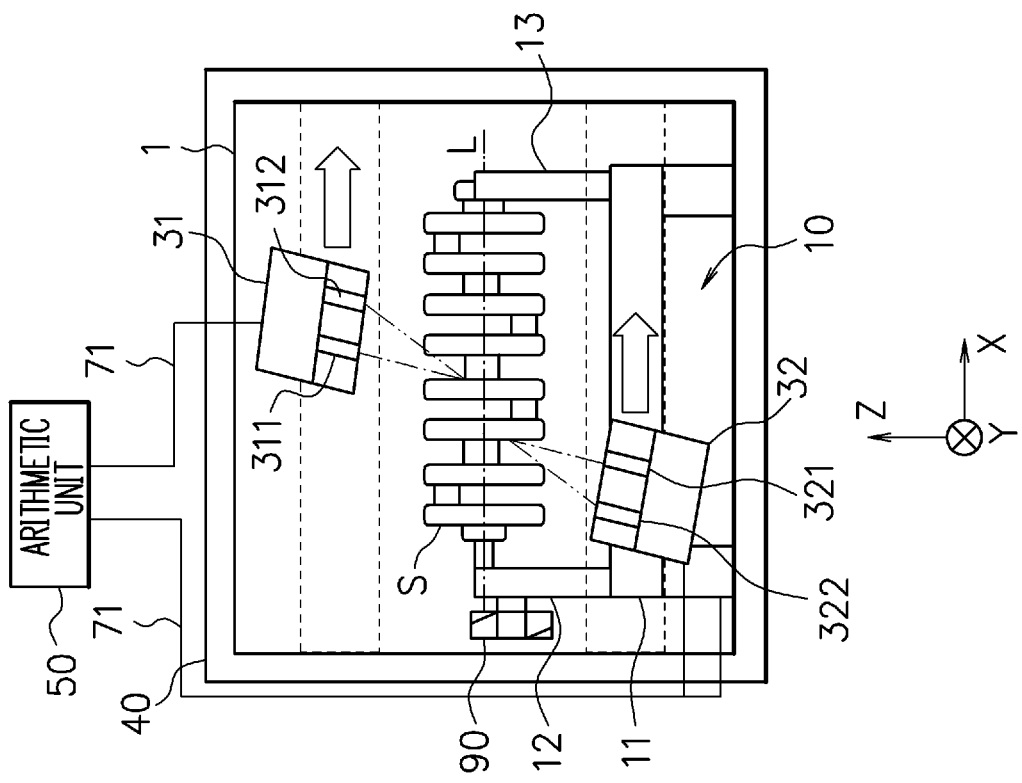

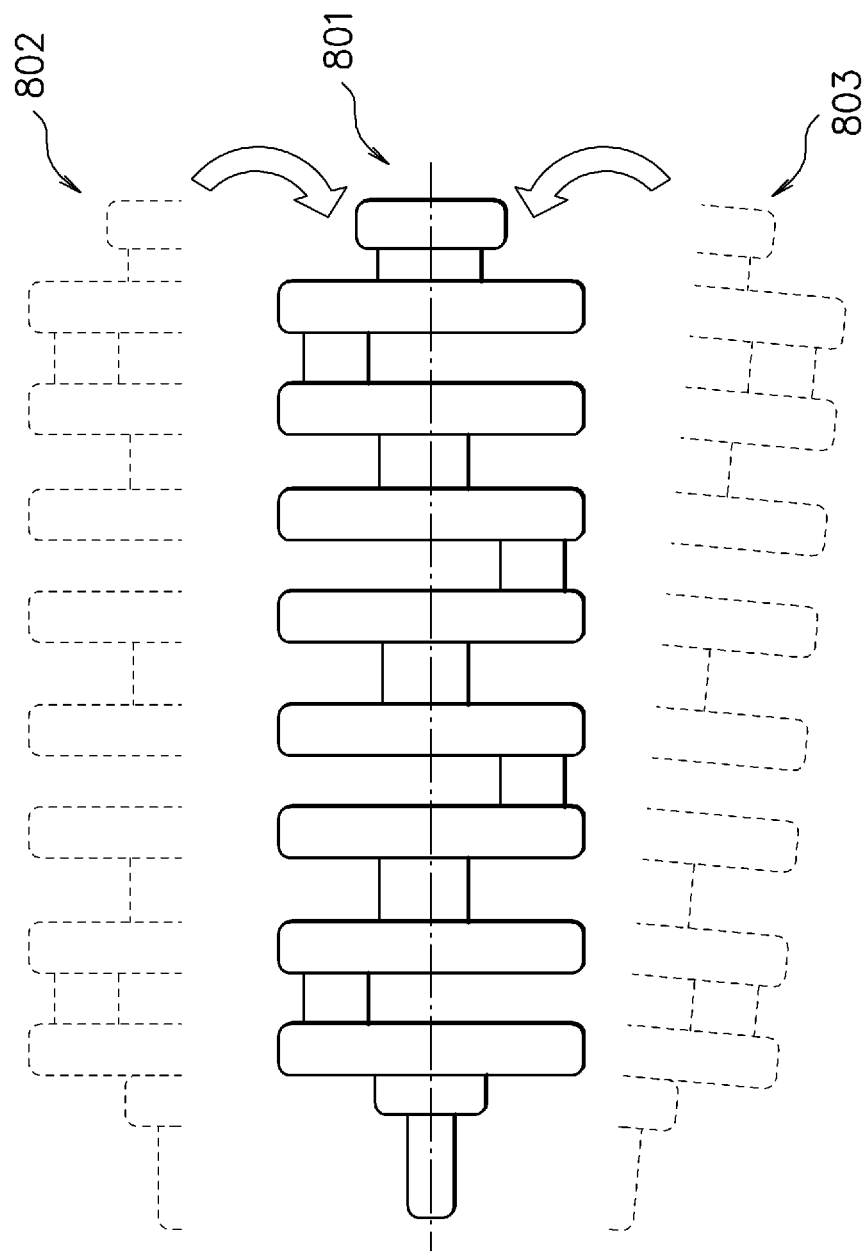

F I G. 11
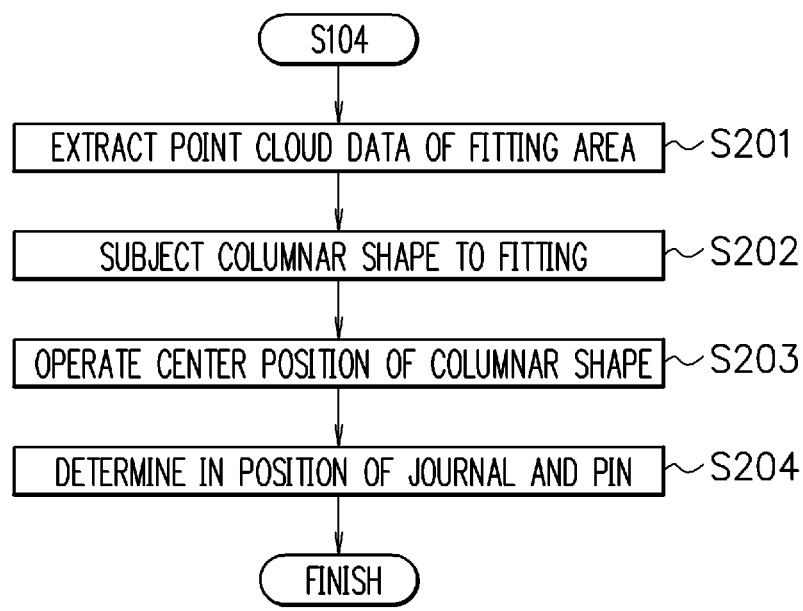

F I G. 12A
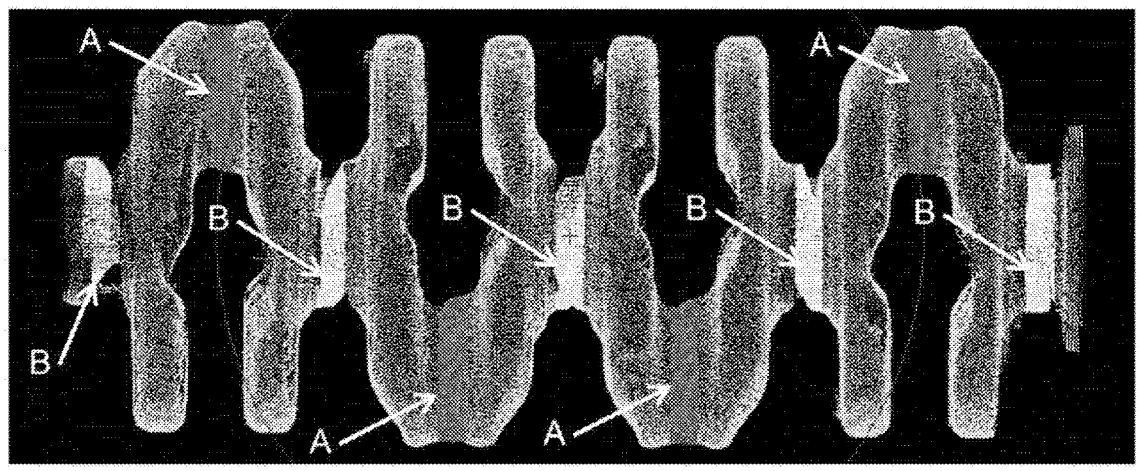
F I G. 12B
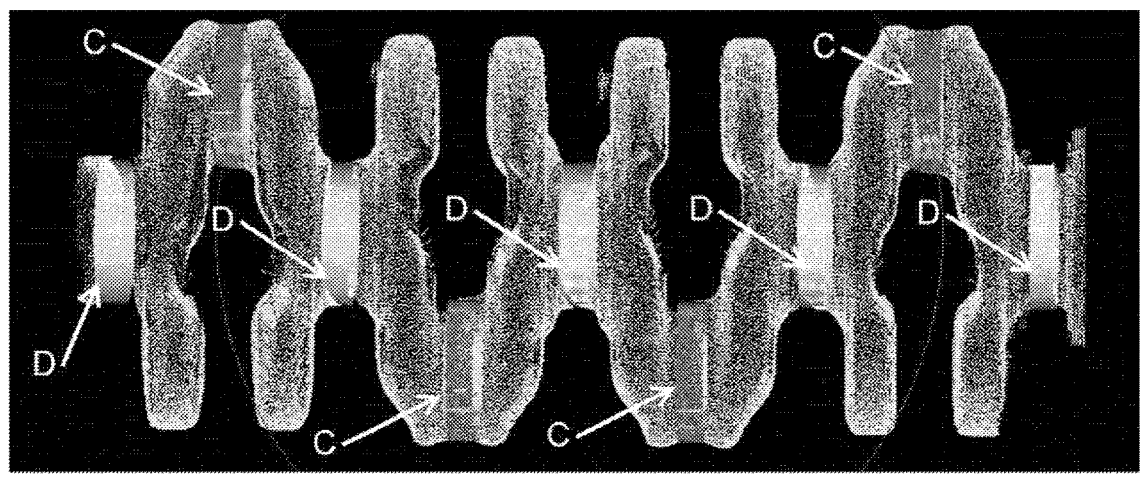

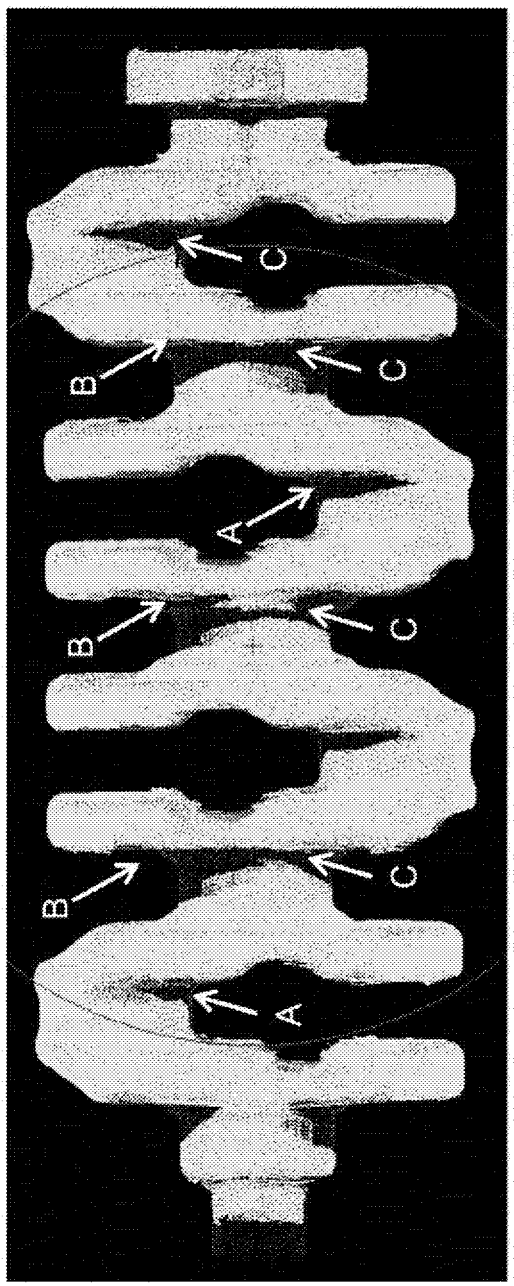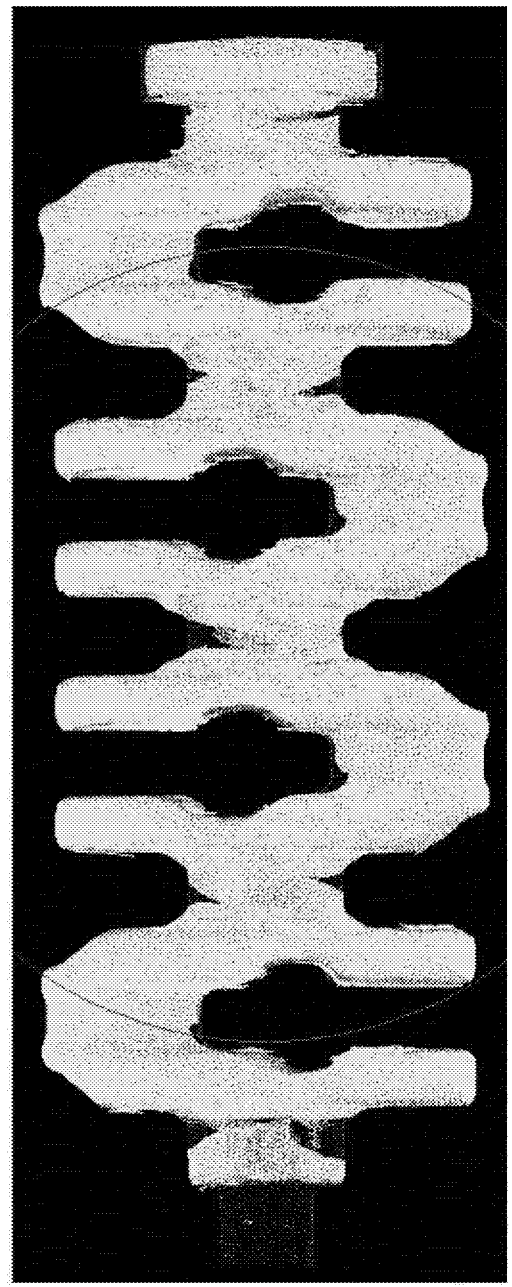
F I G. 18A
F I G. 18B

F I G. 23

| MEASURED PORTION | COLUMN FITTING RESULT | | | | AXIAL CORE | | BEND | | TWST |
|---|---|---|---|---|---|---|---|---|---|
| | CENTER x | CENTER y | CENTER z | RADIUS r | AXIAL_CORE_y | AXIAL_CORE_z | BEND y | BEND z | PIN ANGLE |
| JNL1 | −175.82 | 0.05 | 0.12 | 26.30 | 0.05 | 0.12 | 0.00 | 0.00 | |
| JNL2 | −89.71 | 0.19 | −0.04 | 26.31 | 0.08 | 0.11 | 0.10 | −0.15 | |
| JNL3 | 0.02 | −0.01 | 0.11 | 26.53 | 0.12 | 0.10 | −0.13 | 0.01 | |
| JNL4 | 89.20 | 0.17 | 0.01 | 26.14 | 0.15 | 0.09 | 0.02 | −0.08 | |
| JNL5 | 174.78 | 0.18 | 0.08 | 26.03 | 0.18 | 0.08 | 0.00 | 0.00 | |
| PIN1 | −131.09 | −0.08 | 49.31 | 25.71 | 0.07 | 0.12 | | | 0.00 |
| PIN2 | −43.07 | 0.12 | −49.22 | 25.70 | 0.10 | 0.10 | | | 180.16 |
| PIN3 | 43.08 | −0.06 | −49.23 | 25.76 | 0.13 | 0.09 | | | 180.40 |
| PIN4 | 310.93 | −0.07 | 49.28 | 25.61 | 0.16 | 0.08 | | | −0.09 |

F I G. 25

| MEASURED PORTION | COUNTERWEIGHT POSITIONAL DISPLACEMENT (mm) | |
|---|---|---|
| | LEFT SIDE SURFACE | RIGHT SIDE SURFACE |
| CWT1 | 0.24 | 0.23 |
| CWT2 | 0.19 | −0.11 |
| CWT3 | 0.40 | 0.02 |
| CWT4 | 0.19 | −0.26 |
| CWT5 | 0.26 | −0.13 |
| CWT6 | 0.04 | −0.51 |
| CWT7 | 0.24 | 0.10 |
| CWT8 | 0.13 | 0.07 |

CRANKSHAFT SHAPE INSPECTION APPARATUS, SYSTEM AND METHOD

TECHNICAL FIELD

The present invention relates to a crankshaft shape inspection apparatus, system, and method.

BACKGROUND ART

A crankshaft is manufactured by molding a forged product including fins by die forging through pressing a heated material with upper and lower molds, thereafter removing the fins, and performing shot blast processing. The crankshaft manufactured in these manufacturing processes is subjected to machining so as to be incorporated appropriately in being incorporated into an engine of an automobile, or the like.

FIG. 1 is views schematically illustrating one example of a crankshaft (crankshaft for inline-four engine), and is a front view seen from a direction of a rotation center axis L of a crankshaft S and a side view seen from a direction orthogonal to the rotation center axis L.

The crankshaft S includes a plurality of pins S1 for fixing connecting rods (not illustrated) provided in positions at a predetermined angle around the rotation center axis L, a plurality of counterweights S2 for taking a rotation balance, and a plurality of journals S3. A shape of the pin S1 is a columnar shape with a position separating from the rotation center axis L of the crankshaft S being a center. A shape of the journal S3 is a columnar shape with the rotation center axis L of the crankshaft S being a center. A cross-sectional shape of the counterweight S2 is a symmetrical complex shape.

As described above, since the crankshaft is complex in shape, during forging, variations in material dimensions, unevenness of a material temperature, variations in forging operations, and the like sometimes cause a defect referred to as an underfill in which the material is not filled to an end portion of the mold, a bend or a twist over the entire length of the crankshaft, or a tilting of the counterweights. In addition, contact with conveyance equipment or the like also sometimes causes a dent flaw during handling the crankshaft. In the manufacturing processes of the crankshaft, in order to detect the underfill, the bend, and the twist of the crankshaft subjected to the shot blast processing, and the dent flaw, before performing the machining, an actual shape of the crankshaft is inspected in comparison with a reference shape to judge acceptance or non-acceptance.

As criteria of judgment of acceptance or non-acceptance of the crankshaft, (a) a bend and a twist of a crankshaft and positions of counterweights being each within a predetermined allowable range, (b) absence of an underfill with a depth not allowing sufficient machining stock to be secured and a dent flaw, can be cited.

The reason why a bend and a twist of a crankshaft and positions of counterweights being each within a predetermined allowable range is one of the criteria of judgment of acceptance or non-acceptance as described in the above (a) is that a large displacement of an installation angle of the pins or the positions of the counterweights from predetermined angle or positions due to a large bend or a large twist of the crankshaft makes it difficult to achieve dimensional accuracy or weight balance as a final product even though any processing is performed in a post-process.

Further, the reason why absence of an underfill with a depth not allowing sufficient machining stock to be secured and a dent flaw is one of the criteria of judge of acceptance or non-acceptance as described in the above (b) is that too small machining stock leads to small room to perform machining in the post-process and makes it difficult to achieve the dimensional accuracy or the weight balance as the final product.

A conventional method for inspecting the crankshaft has been the one in which plate gages formed so as to match with reference shapes of the pins and the counterweights are each put to the pins and the counterweights of the crankshaft to be inspected, to measure gaps between the plate gages and the pins and the counterweights with a scale, and if dimensions (shape errors) of the gaps are each in the allowable range, the crankshaft is judged acceptance. Since this method is performed manually by an operator by using the plate gages formed so as to match with the reference shapes of the pins and the counterweights, it has had problems of not only occurrence of an individual difference in inspection accuracy but also a time-consuming inspection. Therefore, in order to perform an accurate inspection automatically, various inspection methods for the crankshaft have been proposed (for example, refer to Patent Literature 1 to Patent Literature 4).

CITATION LIST

Patent Literature

Patent Literature 1: Japanese Laid-open Patent Publication No. 06-265334
Patent Literature 2: Japanese Laid-open Patent Publication No. 10-62144
Patent Literature 3: Japanese Laid-open Patent Publication No. 2010-31987
Patent Literature 4: Japanese Laid-open Patent Publication No. 2007-212357

SUMMARY OF INVENTION

Technical Problem

In Patent Literature 1, there has been proposed a method in which while rotating about a rotation center axis with both ends of a crankshaft fixed by a chuck, a distance to a crankshaft surface is measured by using an optical head which projects laser light in an orthogonal direction of the rotation center axis, thereby calculating angular positions of pins and counterweights of the crankshaft.

In Patent Literature 2, there has been proposed a method of measuring a distance to each of counterweights of a crankshaft with a two-dimensional laser range finder and detecting an underfill of the counterweights by comparison with a reference shape.

It is possible to detect a twist of the crankshaft by the method mentioned in Patent Literature 1 and detect the underfill by the method mentioned in Patent Literature 2. However, because the laser light is not projected on vertical surfaces of the counterweights, namely surfaces standing substantially vertically to the rotation center axis L of the crankshaft S, each of the methods in Patent Literatures 1 and 2 has not allowed shapes of the surfaces to be accurately measured, resulting in that an inspection of counterweight positions has required a manual operation. In addition, the need to rotate the crankshaft and the use of a one-dimensional laser range finder (Patent Literature 1) and the two-dimensional laser range finder (Patent Literature 2) cause time-consuming measurement of a distance over the entire length of the crankshaft. Accordingly, in manufacturing processes of the crankshaft, it is difficult to perform an inspection over the entire length of the crankshaft, and it is necessary to perform a sampling inspection or limit an inspection to portions requiring a minimum inspection of the crankshaft.

In Patent Literature 3, there has been proposed a method of measuring a shape of a material crankshaft with a shape measuring device such as a laser displacement sensor and determining a position of a center hole of the crankshaft.

The method mentioned in Patent Literature 3, in which a two-dimensional shape (outer peripheral edge positions and side surface axial direction positions) of counterweights is measured, does not allow shapes of vertical surfaces of the counterweights to be accurately measured.

In Patent Literature 4, there has been proposed a method in which a surface shape over the whole of a crankshaft is measured by a three-dimensional shape measuring device, while by in a judging three-dimensional model obtained by complementing a portion in which measurement is impossible with a complementary three-dimensional model, the crankshaft is inspected by whether or not to satisfy predetermined criteria.

When whether or not to satisfy the predetermined criteria is judged by the method mentioned in Patent Literature 4, for example, it is considered that basically, by matching three-dimensional point cloud data (judging three-dimensional model) obtained by the three-dimensional shape measuring device and a surface shape model of the crankshaft generated from CAD data or the like based on a design specification of the crankshaft, the displacement amount is evaluated. However, it is difficult to accurately distinguish both such as, whether the displacement amount is caused by a partial flaw such as an underfill or whether it is caused by a bend over the entire length of the crankshaft, or the like.

Therefore, it is an object of the present invention to allow a shape of the crankshaft to be accurately inspected in a short time.

Solution to Problem

One embodiment of the present invention to solve the above-described problem is as follows.

(1) A crankshaft shape inspection apparatus includes:

a support device which supports a crankshaft having a plurality of journals, a plurality of pins, and a plurality of counterweights disposed between the journals and the pins; and four or more shape measuring devices which each have a projection unit which projects light and a light-receiving unit which receives light projected by the projection unit, are disposed around the crankshaft supported by the support device, and acquire partial shape information indicating a partial shape of the crankshaft, wherein the crankshaft supported by the support device and the four or more shape measuring devices are relatively movable in an axial direction of the crankshaft, wherein the four or more shape measuring devices are divided into shape measuring devices in a first group which acquire the partial shape information including one side surfaces of the counterweights in an axial direction of the crankshaft and shape measuring devices in a second group which acquire the partial shape information including other side surfaces of the counterweights in an axial direction of the crankshaft, and wherein the shape measuring devices in the second group are each disposed between the shape measuring devices in the first group in a circumferential direction of the crankshaft.

(2) The crankshaft shape inspection apparatus according to (1), wherein the four or more shape measuring devices are disposed at equal intervals in a circumferential direction of the crankshaft.

(3) The crankshaft shape inspection apparatus according to (1) or (2), wherein the projection unit and the light-receiving unit are disposed side by side in an axial direction of the crankshaft and satisfy $$\beta < \alpha + \beta < \arctan(a/b),$$

Here, $\alpha$ is an angle between a light path of projection light projected from the projection unit and a light path of incident light incident to the light-receiving unit when a shape of the journal is measured, $\beta$ is an inclination angle of a light path closer to a direction orthogonal to an axial direction of the crankshaft between the light path of the projection unit and the light path of the light-receiving unit with respect to a direction orthogonal to an axial direction of the crankshaft, a is a length of the journal, and b is a length between an end portion of the counterweight and the journal.

(4) The crankshaft shape inspection apparatus according to any one of (1) to (3), wherein a positioning target having a predetermined shape is disposed on an extension of an axial direction of the crankshaft.

(5) A crankshaft shape inspection system includes:

the crankshaft shape inspection apparatus according to any one of (1) to (4); and a crankshaft shape information generating means which combines the partial shape information acquired by the crankshaft shape inspection apparatus and generates crankshaft shape information indicating a three-dimensional shape of the crankshaft.

(6) The crankshaft shape inspection system according to (5) includes an operation means which based on the crankshaft shape information and reference data of counterweights prepared in advance, operates data related to the counterweights.

(7) The crankshaft shape inspection system according to (6) includes a storage means which stores reference coordinate information indicating coordinates which are a reference position of the plurality of counterweights, wherein the operation means estimates each position of the plurality of counterweights in the crankshaft shape information by using the reference coordinates stored in the storage means and operates positional displacement data indicating positional displacement of the plurality of counterweights based on reference data of the counterweights.

(8) The crankshaft shape inspection system according to (5) includes:

a storage means which stores reference coordinate information indicating coordinates which are reference positions of the plurality of journals and the plurality of pins;

a position estimation means which estimates each position of the plurality of journals and the plurality of pins in the crankshaft shape information by using the reference coordinates stored in the storage means;

a bend data operation means which operates bend data indicating a bend from a direction of a rotation center axis of the crankshaft from a position of the plurality of journals estimated by the position estimation means; and a twist data operation means which operates twist data indicating a twist of the crankshaft from a position of the plurality of pins estimated by the position estimation means.

(9) The crankshaft shape inspection system according to (8), wherein the position estimation means has:

a fitting means which to each piece of three-dimensional information of a plurality of journals and a plurality of pins the position of which is estimated, subjects a columnar shape having corresponding length and diameter to fitting;

a center position operation means which operates a center position of the columnar shape; and a position determination means which determines a center position of the columnar shape in each position of the plurality of journals and the plurality of pins.

(10) The crankshaft shape inspection system according to any one of (5) to (9), wherein the crankshaft shape information generating means acquires a rigid transformation parameter including a position correction parameter which moves the partial shape and an inclination correction parameter which so as to correct an inclination of a partial shape of the crankshaft, rotates the partial shape, and combines the partial shape information and generates the crankshaft shape information after correcting a position and an inclination of the partial shape information by the rigid transformation parameter.

(11) The crankshaft shape inspection system according to (10), wherein the position correction parameter and the inclination correction parameter are found by measuring a reference sample having true shape data with the plurality of shape measuring devices and superposing partial shape information of a measured reference sample on coordinates of true shape data.

(12) A crankshaft shape inspection system has:

a support device which supports a crankshaft having a plurality of journals, a plurality of pins, and a plurality of counterweights disposed between the journals and the pins;

four or more shape measuring devices which are disposed around the crankshaft supported by the support device, are relatively movable in an axial direction of the crankshaft with respect to the crankshaft, and each acquire partial shape information indicating a partial shape of the crankshaft;

a storage means which stores reference coordinate information indicating coordinates which are reference positions of the plurality of journals and the plurality of pins;

a crankshaft shape information generating means which combines the partial shape information and generates crankshaft shape information indicating a three-dimensional shape of the crankshaft;

a position estimation means which estimates each position of the plurality of journals and the plurality of pins in the crankshaft shape information by using the reference coordinates stored in the storage means;

a bend data operation means which operates bend data indicating a bend from a direction of a rotation center axis of the crankshaft from a position of the plurality of journals estimated by the position estimation means; and a twist data operation means which operates twist data indicating a twist of the crankshaft from a position of the plurality of pins estimated by the position estimation means.

(13) A crankshaft shape inspection method includes:

relatively moving four or more shape measuring devices disposed around a crankshaft having a plurality of journals, a plurality of pins, and a plurality of counterweights disposed between the journals and the pins in an axial direction of the crankshaft with respect to the crankshaft and acquiring partial shape information indicating a partial shape of the crankshaft;

combining the partial shape information and generating crankshaft shape information indicating a three-dimensional shape of the crankshaft;

estimating each position of the plurality of journals and the plurality of pins in shape information of the crankshaft by using reference coordinate information indicating coordinates which are reference positions of the plurality of journals and the plurality of pins;

operating bend data indicating a bend from a direction of a rotation center axis of the crankshaft from an estimated position of the plurality of journals; and operating twist data indicating a twist of the crankshaft from an estimated position of the plurality of pins.

Advantageous Effects of Invention

According to an embodiment of the present invention, it is possible to accurately inspect a shape of a crankshaft in a short time.

BRIEF DESCRIPTION OF DRAWINGS

FIG. 3A is a side view schematically illustrating the crankshaft shape inspection apparatus.

FIG. 3B is a side view schematically illustrating the crankshaft shape inspection apparatus.

FIG. 10 is a view for explaining processing in S103 illustrated in FIG. 7.

FIG. 11 is a flowchart for explaining processing in S104 illustrated in FIG. 7.

FIG. 12A is a view illustrating one example of three-dimensional data of a crankshaft in which fitting areas have been extracted by processing in S201 illustrated in FIG. 11.

FIG. 12B is a view illustrating one example of three-dimensional data of a crankshaft in which columnar shapes have been subjected to fitting by processing in S202 illustrated in FIG. 11.

FIG. 18A is a view illustrating a three-dimensional shape of the crankshaft generated by the crankshaft shape inspection apparatus illustrated in FIG. 16A.

FIG. 18B is a view illustrating a three-dimensional shape of a crankshaft S generated by the crankshaft shape inspection apparatus according to the embodiment.

FIG. 23 is a chart illustrating bend data and twist data operated in Example.

FIG. 25 is a chart illustrating positional displacement amounts of counterweights operated in Example.

DESCRIPTION OF EMBODIMENTS

Hereinafter, an embodiment of the present invention will be explained referring to the accompanying drawings.
(Configuration and Function of Crankshaft Shape Inspection System According to an Embodiment)

A crankshaft shape inspection system according to the embodiment of the present invention includes a crankshaft shape inspection apparatus 1 and an arithmetic unit 50.

Figure 1:
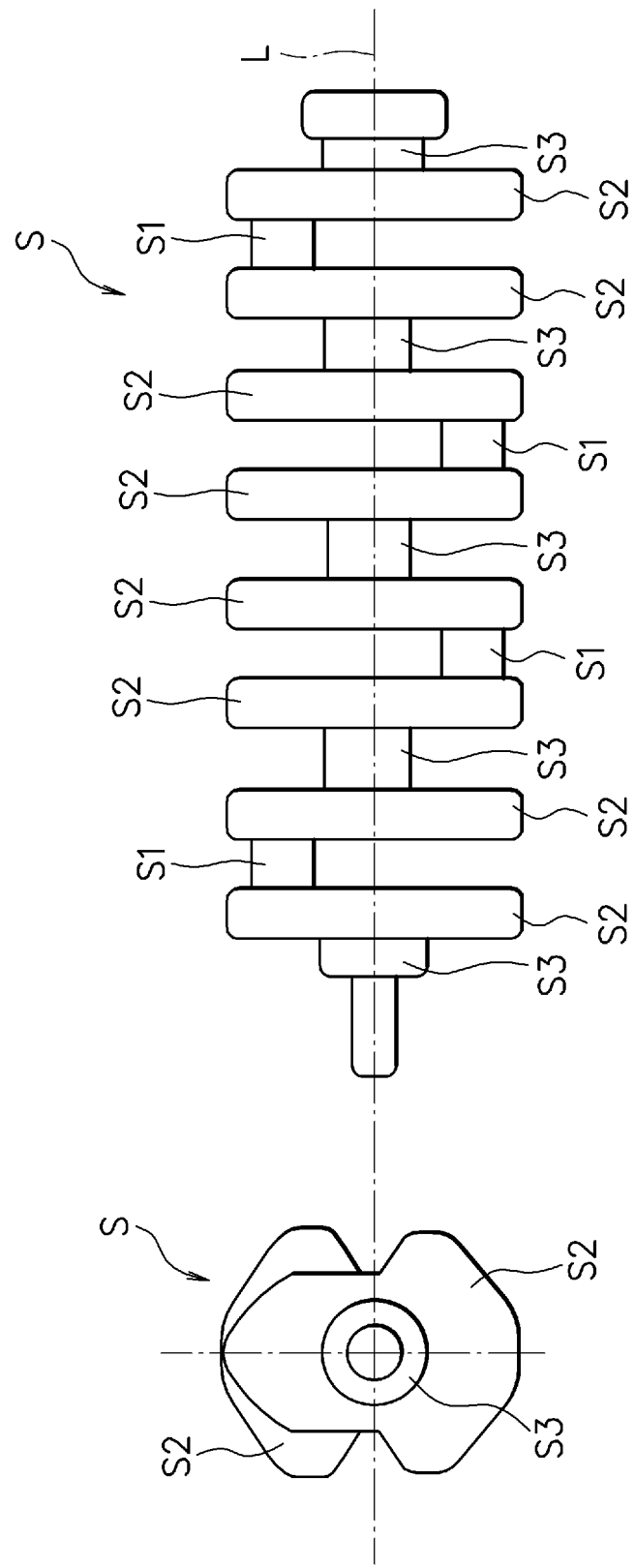
FIG. 1 is a view schematically illustrating one example of a crankshaft.
Figure 2:
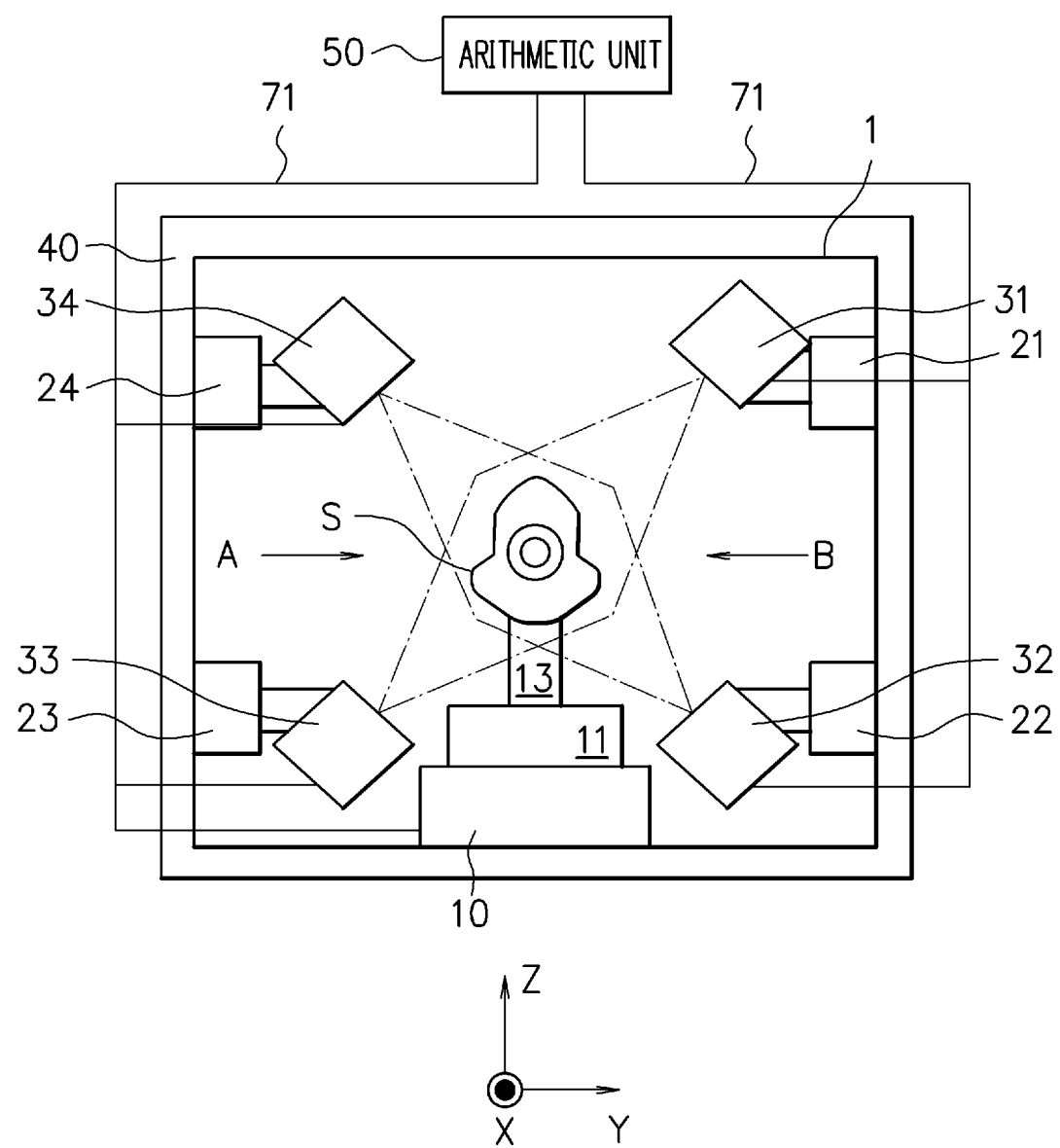
FIG. 2 is a front perspective view schematically illustrating a crankshaft shape inspection apparatus according to an embodiment.

FIG. 2, FIG. 3A, and FIG. 3B each schematically illustrate mainly a schematic configuration of the crankshaft shape inspection apparatus 1. FIG. 2 is a front perspective view of the crankshaft shape inspection apparatus 1 seen from a direction of a rotation axis L of a crankshaft S. Further, FIG. 3A is a side view of the crankshaft shape inspection apparatus 1 seen from a direction of an arrow A illustrated in FIG. 2, and FIG. 3B is a side view of the crankshaft shape inspection apparatus 1 seen from a direction of an arrow B illustrated in FIG. 2. As illustrated in FIG. 2, FIG. 3A, and FIG. 3B, a long direction of the crankshaft shape inspection apparatus 1 is set as an X direction, a width direction of the crankshaft shape inspection apparatus 1 is set as a Y direction, and a height direction of the crankshaft shape inspection apparatus 1 is set as a Z direction.

The crankshaft shape inspection apparatus 1 includes a support device 10, a first mobile device 21 to a fourth mobile device 24, a first shape measuring device 31 to a fourth shape measuring device 34, a casing 40, and a positioning target 90.

The support device 10 includes a base 11 extending in the X direction, a first support part 12 extending in the Z direction from one end of the base 11, and a second support part 13 extending in the Z direction from the other end of the base 11. The first support part 12 supports one end of the crankshaft S, and the second support part 13 supports the other end of the crankshaft S. By supporting both the ends of the crankshaft S with the first support part 12 and the second support part 13, the support device 10 supports the crankshaft S in an axial direction position and an axial core in a predetermined position in a predetermined posture. In one example, V-shaped support parts are disposed at both end shaft portions of the crankshaft, and a height of each of the V-shaped support parts is adjusted by matching with a shaft diameter of each of both ends of the crankshaft, and by disposing the crankshaft thereon, the support device 10 supports the crankshaft S in the predetermined position in the predetermined posture. When the crankshaft S is supported, the support device 10 outputs a support signal indicating that the crankshaft S has been supported to the first mobile device 21 to the fourth mobile device 24 and the arithmetic unit 50.

Figure 20:
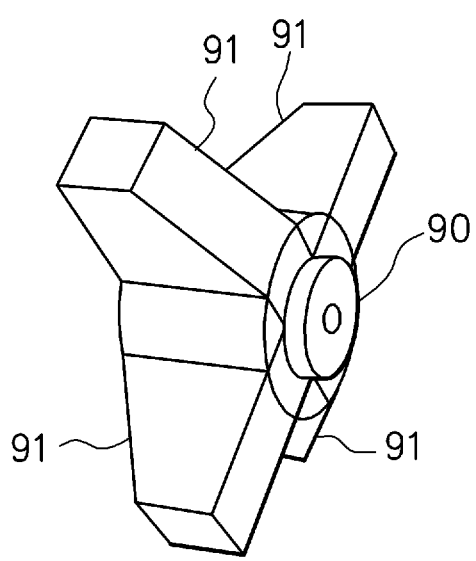
FIG. 20 is a view illustrating an example of a positioning target.

As illustrated in FIG. 3A and FIG. 3B, the positioning target 90 is disposed next to the first support part 12. FIG. 20 illustrates one example of the positioning target 90. The positioning target 90 has unique inclined surfaces 91 for positioning in which exact position and shape are recognized in advance in a field of view of each of the shape measuring devices 31 to 34 and is measured with the crankshaft S, thereby improving position measurement accuracy in a rotation axis direction. Note that in the drawings (FIG. 2 and the like) other than FIG. 3A and FIG. 3B, an illustration of the positioning target 90 is omitted.

The first mobile device 21 to the fourth mobile device 24 are disposed around the crankshaft S supported by the support device 10 with phases displaced by 90 degrees from each other in its circumferential direction, and mount the first shape measuring device 31 to the fourth shape measuring device 34 respectively.

The first mobile device 21 to the fourth mobile device 24 move the first shape measuring device 31 to the fourth shape measuring device 34 in a direction parallel to a rotation center axis L of the crankshaft S respectively. Hereinafter, an extending direction of the rotation center axis L of the crankshaft S and a direction parallel thereto are referred to as "an axial direction of the crankshaft S". In one example, it is preferable that each of the mobile devices 21 to 24 is a uniaxial stage and is the one whose moving speed is set to 100 mm/sec to 200 mm/sec and which can grasp positioning or a position in a resolution of 0.1 mm or less.

The support signal is inputted to the first mobile device 21 to the fourth mobile device 24, which move to a measurement start position and move therefrom in the axial direction of the crankshaft S. In each of FIG. 3A and FIG. 3B, thick arrows indicate moving directions at a time of shape measurement. In one example, the measurement start position is a position of the positioning target 90 next to the first support part 12.

The first shape measuring device 31 to the fourth shape measuring device 34 to be mounted on the first mobile device 21 to the fourth mobile device 24 are also disposed around the crankshaft S supported by the support device 10 with phases displaced by 90 degrees from each other in its circumferential direction. That is, the first mobile device 21 to the fourth mobile device 24 are disposed at substantially equal intervals in the circumferential direction of the crankshaft S.

In one example, the first shape measuring device 31 to the fourth shape measuring device 34 are each a three-dimensional shape measuring device in a line pattern projection method. Each of the shape measuring devices 31 to 34 includes a projection unit which projects projection light indicating a line pattern with a slit laser toward a measuring object and a light-receiving unit which is a camera, and these projection unit and light-receiving unit are disposed side by side in the axial direction of the crankshaft S. Specifically, the first shape measuring device 31 includes a projection unit 311 and a light-receiving unit 312, the second shape measuring device 32 includes a projection unit 321 and a light-receiving unit 322, the third shape measuring device 33 includes a projection unit 331 and a light-receiving unit 332, and the fourth shape measuring device 34 includes a projection unit 341 and a light-receiving unit 342. In FIG. 2, FIG. 3A, and FIG. 3B, a light path (light axis) of projection light projected from each of the shape measuring devices 31 to 34 to the crankshaft S is indicated by a dot and dash line, and a light path (light axis) of incident light reflected off the crankshaft S and incident to each of the shape measuring devices 31 to 34 is indicated by a two-dot chain line. In each of the shape measuring devices 31 to 34, projection light indicating a line pattern is projected from the projection unit toward a measuring object, and the light-receiving unit receives reflected light from the measuring object on which the line pattern has been projected, thereby capturing an image of the measuring object on which the line pattern has been projected. Each of the shape measuring devices 31 to 34 transmits deformation of the line pattern of the imaged measuring object as data to the arithmetic unit 50, resulting in that a surface shape of the measuring object can be measured by using a principle of triangulation. In one example, each of the shape measuring devices 31 to 34 is LJ-V7300 manufactured by KEYENCE CORPORATION. When a distance to the crankshaft S is 400 mm, a measurement field of view in the Y direction of each of the shape measuring devices 31 to 34 is 180 mm. A measuring period of each of the shape measuring devices 31 to 34 is 200 Hz to 500 Hz, a measurement resolution in the X direction is 0.3 mm, and a measurement resolution in the Z direction is 0.02 mm. When the measuring period is set to 200 Hz and the moving speed is set to 100 mm/sec, each of the shape measuring devices 31 to 34 acquires three-dimensional shape data in which a resolution in the X direction is 0.5 mm, a resolution in the Y direction is 0.3 mm, and a resolution in the Z direction is 0.02 mm. Similarly, when the measuring period is set to 500 Hz and the moving speed is set to 200 mm/sec, a resolution in the X direction becomes 0.4 mm.

The same model is used for the first shape measuring device 31 to the fourth shape measuring device 34, and between the adjacent shape measuring devices, they are disposed so that positional relationships between the projection unit and the light-receiving unit in the axial direction of the crankshaft S are opposite to each other. For example, when attention is focused on the first shape measuring device 31, with respect to the second shape measuring device 32 and the fourth shape measuring device 34 adjacent thereto, the positional relationships between the projection unit and the light-receiving unit in the axial direction of the crankshaft S are opposite to each other.

Specifically, in the first shape measuring device 31, the projection unit 311 and the light-receiving unit 312 are arranged in that order toward an X positive direction. In the second shape measuring device 32, the light-receiving unit 322 and the projection unit 321 are arranged in that order toward the X positive direction. In the third shape measuring device 33, the projection unit 331 and the light-receiving unit 332 are arranged in that order toward the X positive direction. In the fourth shape measuring device 34, the light-receiving unit 342 and the projection unit 341 are arranged in that order toward the X positive direction.

Here, the first shape measuring device 31 and the third shape measuring device 33 are each disposed to be inclined with respect to the axial direction of the crankshaft S so that the projection unit and light-receiving unit face slightly to an X negative direction. Thus inclining the first shape measuring device 31 and the third shape measuring device 33 makes it possible to acquire partial shape information indicating a partial shape of the crankshaft S, including surfaces facing to the X positive direction in counterweights S2 (hereinafter, referred to as side surfaces in the X positive direction).

The first shape measuring device 31 and the third shape measuring device 33 are disposed with phases displaced 180 degrees from each other in the circumferential direction of the crankshaft S. Providing a field of view capable of covering the half of the circumferential direction (a semicircle 180 degrees) of the crankshaft S for each of the shape measuring devices 31 and 33 makes it possible to acquire the partial shape information of the whole area of the circumferential direction (the whole circumference 360 degrees) of the crankshaft S.

At the same time, the second shape measuring device 32 and the fourth shape measuring device 34 are each disposed to be inclined with respect to the axial direction of the crankshaft S so that the projection unit and light-receiving unit face slightly to the X positive direction. Thus inclining the second shape measuring device 32 and the fourth shape measuring device 34 makes it possible to acquire partial shape information indicating a partial shape of the crankshaft S, including surfaces facing to the X negative direction in the counterweights S2 (hereinafter, referred to as side surfaces in the X negative direction).

The second shape measuring device 32 and the fourth shape measuring device 34 are disposed with phases displaced 180 degrees from each other in the circumferential direction of the crankshaft S. Providing a field of view capable of covering the half of the circumferential direction (a semicircle 180 degrees) of the crankshaft S for each of the shape measuring devices 32 and 34 makes it possible to acquire the partial shape information of the whole area of the circumferential direction (the whole circumference 360 degrees) of the crankshaft S.

That is, as described above, a plurality of (suitably four or more) shape measuring devices can be divided into, based on division of areas where the partial shape information is acquired, the shape measuring devices capable of acquiring the partial shape information of the above-described side surfaces in the X positive direction as "a first group" and the shape measuring devices capable of acquiring the partial shape information of the above-described side surfaces in the X negative direction as "a second group".

The shape measuring devices in the first group and the shape measuring devices in the second group are basically disposed alternately in the circumferential direction of the crankshaft S, but when the total number of shape measuring devices is an odd number, the same group is repeated inevitably at the end. Such a slight departure is allowable. That is, in the circumferential direction of the crankshaft, the shape measuring devices in the second group are each disposed between the shape measuring devices in the first group.

Figure 4:
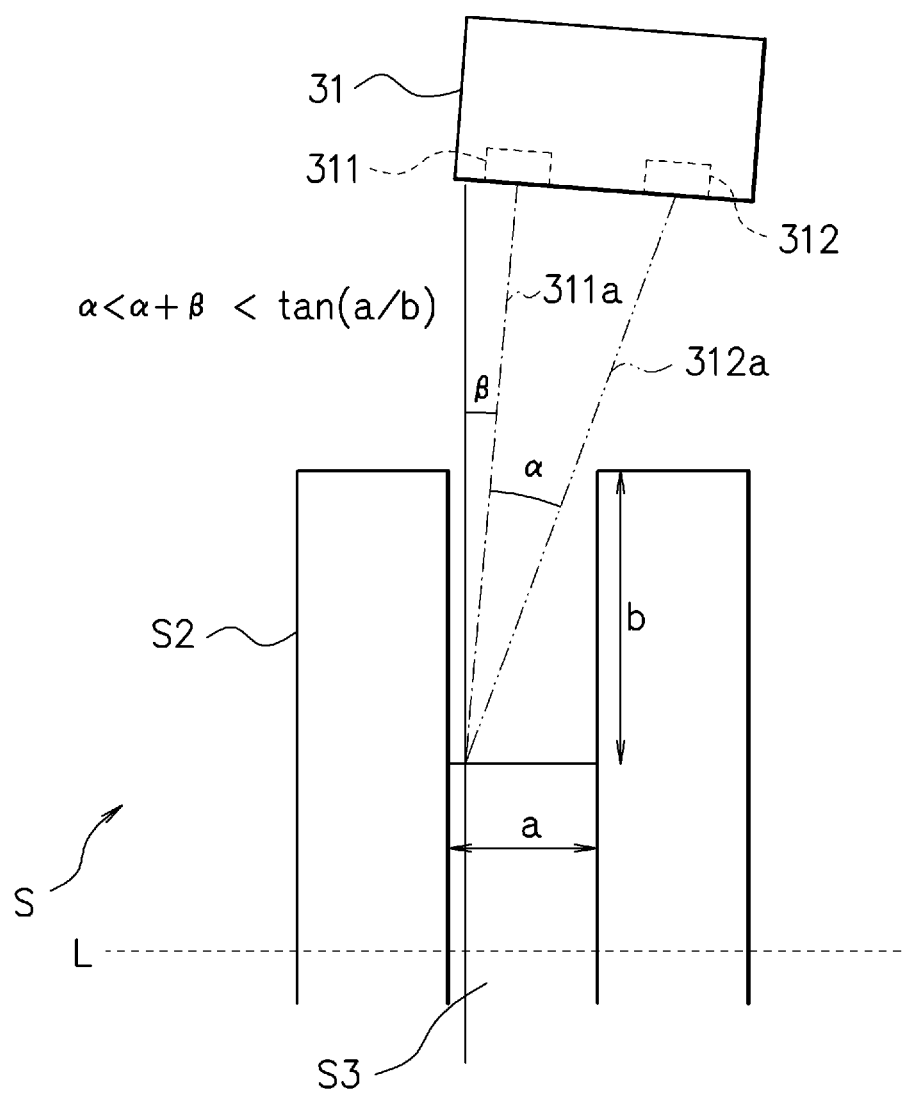
FIG. 4 is a view illustrating a positional relationship between a first shape measuring device and a crankshaft.

Referring to FIG. 4, an inclination of the first shape measuring device 31 will be explained. Note that an inclination of each of the second shape measuring device 32, the third shape measuring device 33, and the fourth shape measuring device 34 is also similar thereto.

FIG. 4 is a view schematically illustrating a positional relationship between the first shape measuring device 31, and the counterweights S2 and the journal S3 of the crankshaft S. In FIG. 4, a dotted line indicates the rotation center axis L of the crankshaft S, a dot and dash line indicates a projection light axis 311a from the projection unit 331, and a two-dot chain line indicates a light-receiving axis 312a to the light-receiving unit 312.

In the first shape measuring device 31, the projection light axis 311a and the light-receiving axis 312a satisfy the following relationship.

$$\beta < \alpha + \beta < \arctan(a/b)$$

Here, α is an angle between the projection light axis 311a projected from the projection unit 311 and the light-receiving axis 312b incident to the light-receiving unit 312 when the first shape measuring device 31 measures a shape of any one of the journals of the crankshaft S. Further, β is an inclination angle of the projection light axis 311a of the projection unit 311 with respect to a direction orthogonal to the axial direction (X positive/negative directions) of the crankshaft S and corresponds to an inclination angle of the first shape measuring device 31. Further, a is a length of the journal S3, and b is a length between an end portion of the counterweight S2 facing the first shape measuring device 31 and a connecting portion with the journal S3.

Thus inclining each of the first shape measuring device 31 and the third shape measuring device 33 at the inclination angle β makes it possible to acquire a three-dimensional shape of the side surfaces in the X positive direction of the counterweights S2. Further, inclining each of the second shape measuring device 32 and the fourth shape measuring device 34 at the inclination angle β makes it possible to acquire a three-dimensional shape of the side surfaces in the X negative positive direction of the counterweights S2. In this case, a large inclination angle β results in the possibility that the journals S3 are hidden by the next counterweights S2 and a three-dimensional shape of the journals S3 cannot be acquired. In the crankshaft S in general, because a ratio of the length a of the journal S3 to the length b between the end portion of the counterweight S2 of the crankshaft S and the journal S3 is at least 0.5 or more, β which becomes α+β<31.3 degrees is preferably employed.

Figure 19:
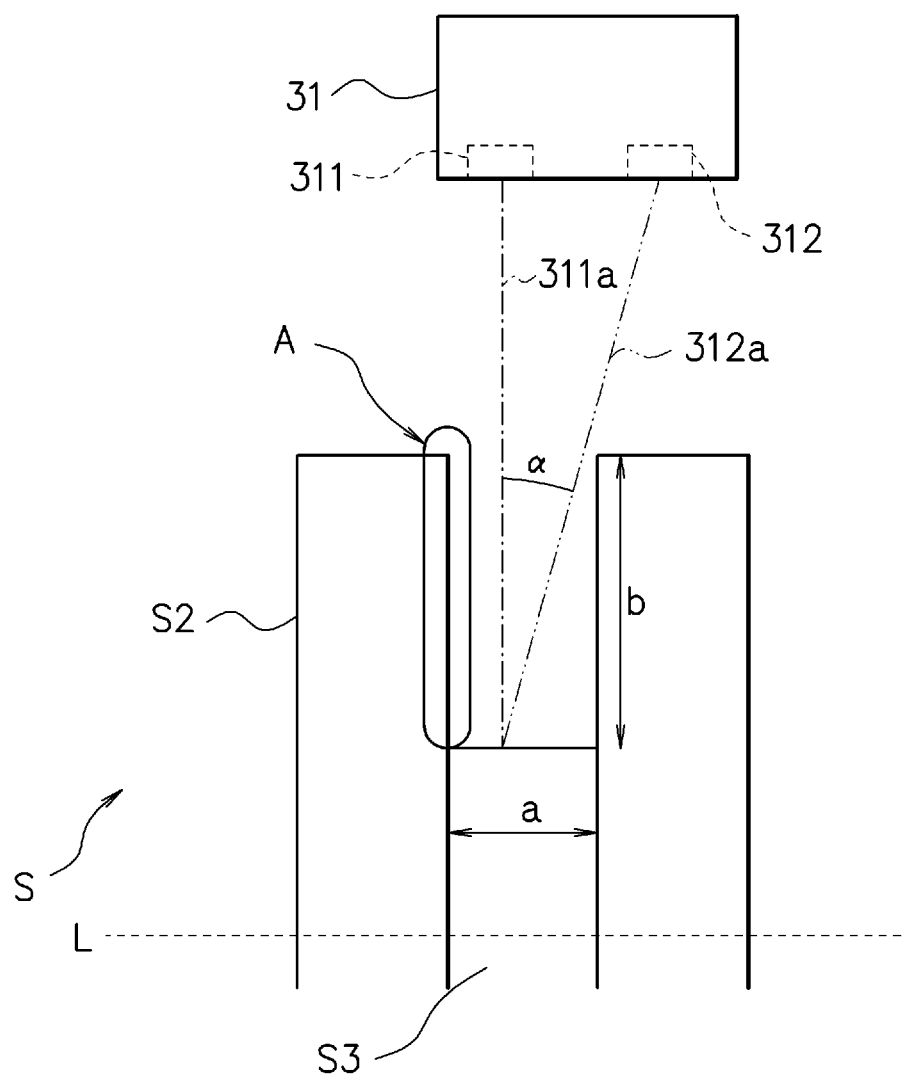
FIG. 19 is a view illustrating a positional relationship between the first shape measuring device and the crankshaft when an inclination angle β is zero.

As a comparative example, FIG. 19 is a view schematically illustrating a positional relationship between the first shape measuring device 31, and the counterweights S2 and the journal S3 of the crankshaft S when the inclination angle β is zero. Note that for simplicity of explanation, the explanation will be made by denoting the same reference signs as those in FIG. 4.

When the inclination angle β is zero, the first shape measuring device 31 cannot acquire a three-dimensional shape of a side surface of a counterweight S2 indicated by an arrow A in FIG. 19. In contrast to that, when the inclination angle β is larger than zero as illustrated in FIG. 4, the first shape measuring device 31 can acquire the three-dimensional shape of the side surface of the counterweight S2.

This embodiment exemplifies that each of the shape measuring devices 31 to 34 is itself inclined with respect to the axial direction of the crankshaft S, but this is not necessarily restrictive. It is sufficient to be a relationship in which the projection light axis from the projection unit and the light-receiving axis to the light-receiving unit of each of the shape measuring devices 31 to 34 are inclined with respect to the direction orthogonal to the axial direction of the crankshaft S and face to both the side surfaces of the counterweights in the axial direction of the crankshaft S.

Note that this embodiment employs a configuration in which the first shape measuring device 31 to the fourth shape measuring device 34 are moved by the first mobile device 21 to the fourth mobile device 24, but this is not necessarily restrictive. For example, a configuration in which the first shape measuring device 31 to the fourth shape measuring device 34 are fixed and the crankshaft S is moved in its axial direction is also applicable. That is, it is sufficient that providing a mechanism allowing the shape measuring devices and the crankshaft S to be relatively moved makes it possible to move the shape measuring devices relatively to the crankshaft S.

Further, the explanation is made by the configuration in which four shape measuring devices are moved by four mobile devices, but this is not restrictive, and such a mechanism as moves a plurality of shape measuring devices with a smaller number of mobile devices by mounting the plurality of shape measuring devices on one mobile device, or the like is also applicable.

In addition, this embodiment exemplifies that the projection unit and the light-receiving unit provided in each of the shape measuring devices 31 to 34 are disposed side by side in the axial direction of the crankshaft S, but this is not necessarily restrictive. For example, a case where the projection unit and the light-receiving unit are disposed in the direction orthogonal to the axial direction of the crankshaft S is also applicable. In addition, the order of the projection unit and the light-receiving unit in the axial direction of the crankshaft S can also be appropriately set.

That is, the positional relationship between the projection unit and the light-receiving unit is not limited as long as the projection unit and the light-receiving unit are arranged so that each of the shape measuring devices can set either of the side surfaces in the X positive direction or the side surfaces in the X negative direction as an object of acquisition of the partial shape information and can acquire the partial shape information of all the side surfaces in the X positive direction and all the side surfaces in the X negative direction of the crankshaft S as all the shape measuring devices by one movement with the mobile devices, and light projected from the projection unit is properly received by the light-receiving unit.

Figure 5:
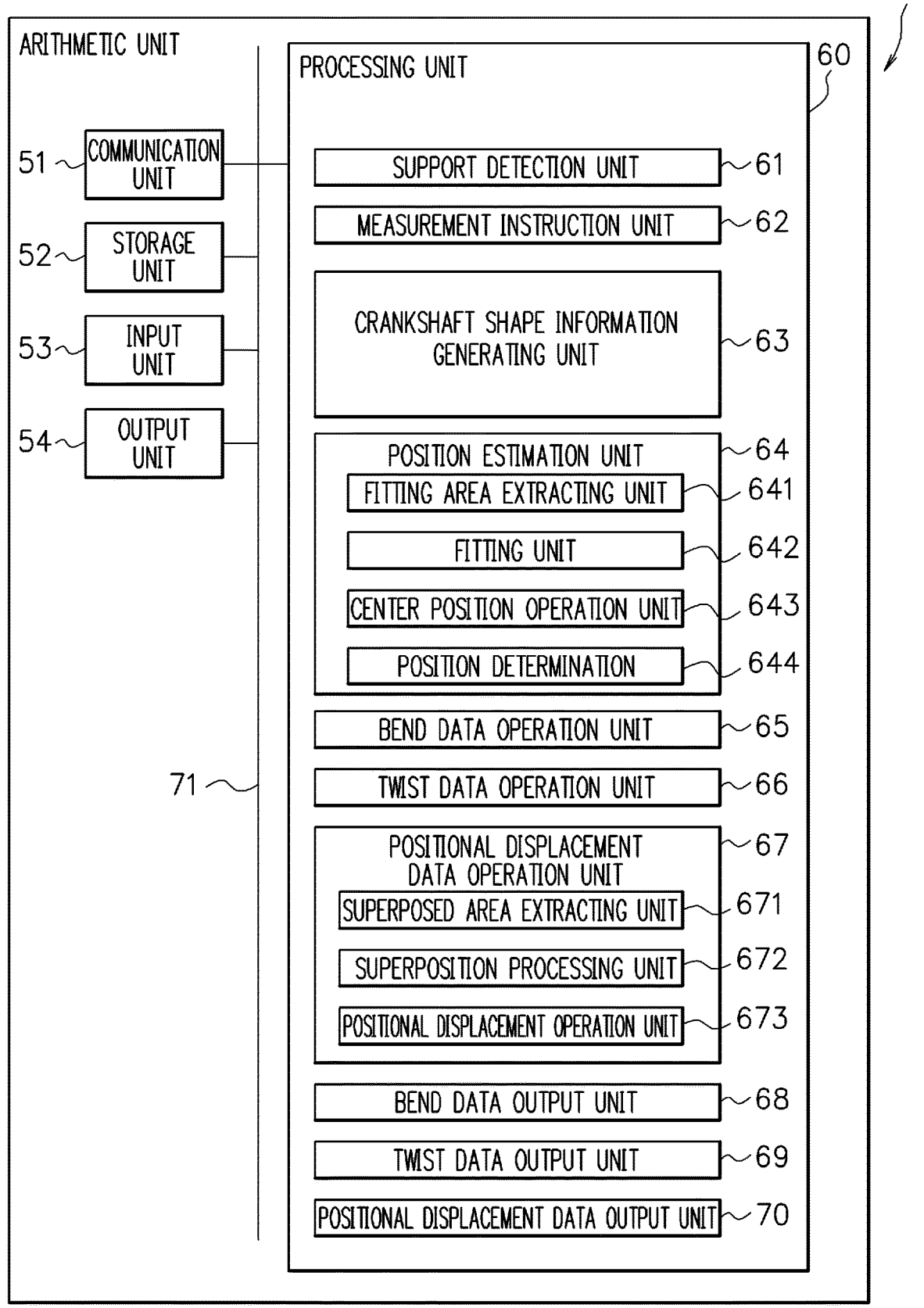
FIG. 5 is a block diagram illustrating a configuration example of an arithmetic unit according to the embodiment.

FIG. 5 is a block diagram illustrating a configuration example of the arithmetic unit 50.

The arithmetic unit 50 includes a communication unit 51, a storage unit 52, an input unit 53, an output unit 54, and a processing unit 60. The communication unit 51, the storage unit 52, the input unit 53, the output unit 54, and processing unit 60 are connected with each other via a cable 71 which is a bus in one example. The arithmetic unit 50 operates bend data indicating a bend from the axial direction of the crankshaft S and twist data indicating a twist of the crankshaft S, and further, operates positional displacement data indicating positional displacement of the counterweights. In one example, the arithmetic unit 50 is a personal computer.

The communication unit 51 has a wired communication interface circuit such as Ethernet (registered trademark). The communication unit 51 communicates with the support device 10, the first mobile device 21 to the fourth mobile device 24, the first shape measuring device 31 to the fourth shape measuring device 34, and so on via the cable 71.

The storage unit 52 includes at least one of, for example, a semiconductor memory device, a magnetic tape drive, a magnetic disk device, or an optical disk device. The storage unit 52 stores an operating system program, a driver program, an application program, data, and the like to be used for processing in the processing unit 60. For example, the storage unit 52 stores, as the application program, a data operation program for causing the processing unit 60 to execute arithmetic processing in which the bend data and the twist data of the crankshaft S are operated or arithmetic processing in which the positional displacement data is operated, or the like. The data operation program may be installed from a computer-readable portable storage medium such as, for example, a CD-ROM or a DVD-ROM to the storage unit 52 by using a publicly-known setup program, or the like.

In addition, the storage unit 52 stores various pieces of data with CAD data based on a product design drawing of the crankshaft S and reference coordinate information indicating reference coordinates being reference positions of a plurality of journals S3, a plurality of pins S1, and a plurality of counterweights S2 of the crankshaft S which is used for data operation processing. Moreover, the storage unit 52 may temporarily store temporary data related to predetermined processing.

The input unit 53 may be any device as long as data can be inputted, and is, for example, a touch panel, a key button, or the like. An operator can input characters, numbers, signs, and so on by using the input unit 53. The input unit 53 is operated by the operator, thereby generating a signal in response to the operation. The signal generated by the input unit 53 is supplied to the processing unit 60 as an instruction of the operator. In one example, the operator can instruct a targeted gap length by using the input unit 53.

The output unit 54 may be any device as long as video, images, or the like can be displayed, and is, for example, a liquid crystal display, an organic EL (Electro-Luminescence) display, or the like. The output unit 54 displays video corresponding to video data, images corresponding to image data, or the like supplied from the processing unit 60. In addition, the output unit 54 may be an output device which prints the video, the images, characters, or the like on a display medium such as a piece of paper.

The processing unit 60 has one or a plurality of processors and peripheral circuits thereof. The processing unit 60 controls overall operation of the arithmetic unit 50 collectively, and is constituted of, for example, a CPU. The processing unit 60 executes processing based on the programs (the driver program, the operating system program, the application program, and so on) stored in the storage unit 52. Further, the processing unit 60 can execute a plurality of programs (the application program and the like) in parallel.

The processing unit 60 has a support detection unit 61, a measurement instruction unit 62, a crankshaft shape information generating unit 63, a position estimation unit 64, a bend data operation unit 65, a twist data operation unit 66, and a positional displacement data operation unit 67. In addition, the processing unit 60 further has a bend data output unit 68, a twist data output unit 69, and a positional displacement data output unit 70.

The position estimation unit 64 has a fitting area extracting unit 641, a fitting unit 642, a center position operation unit 643, and a position determination unit 644. Further, the positional displacement data operation unit 67 has a superposed area extracting unit 671, a superposition processing unit 672, and a positional displacement data operation unit 673.

These units are each a functional module to be achieved through the programs executed by the processors provided for the processing unit 60. Alternatively, these units may each be mounted on the arithmetic unit 50 as firmware.

(Advance Preparations for a Crankshaft Shape Inspection in the Embodiment)

Figure 6:
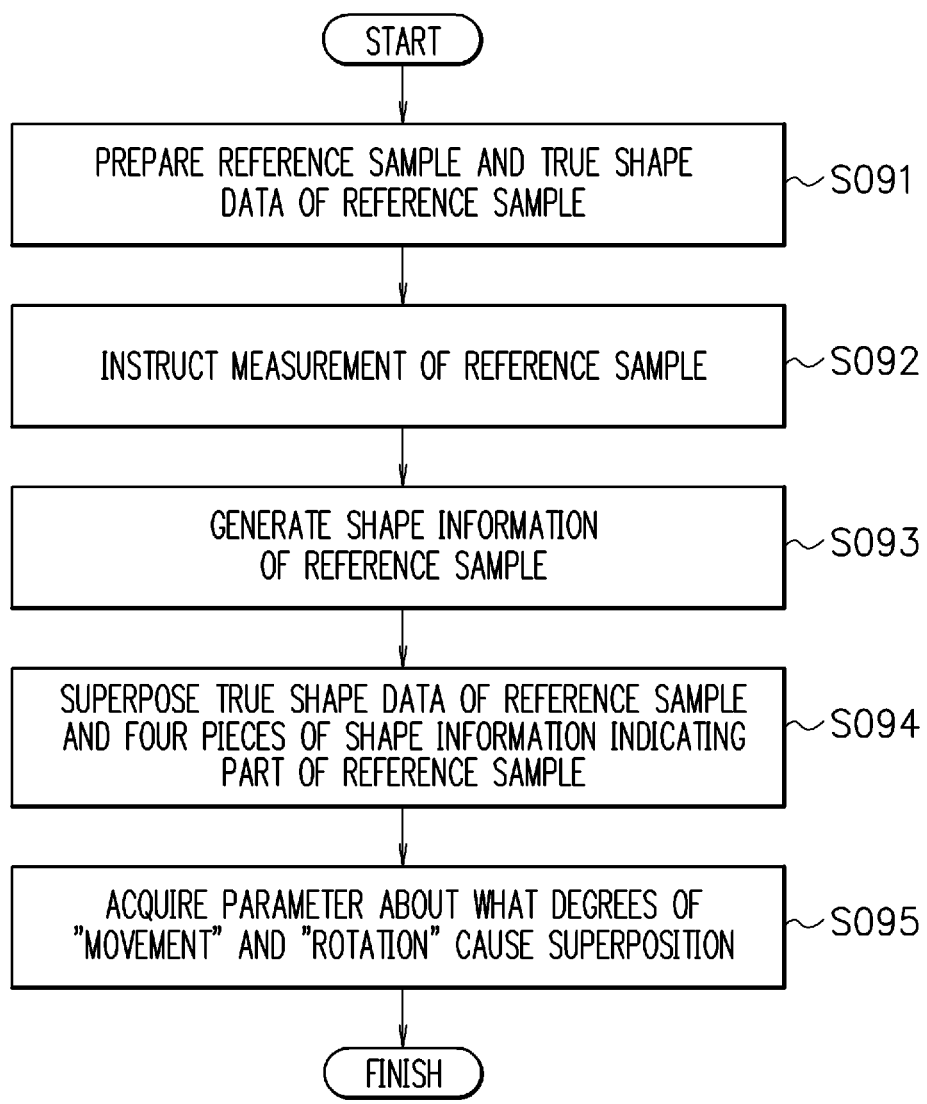
FIG. 6 is a flowchart for explaining advance preparations for a crankshaft shape inspection.

FIG. 6 is a flowchart related to processing required in advance in order to correct variations between coordinate systems which each of the shape measuring devices 31 to 34 has in performing a crankshaft shape inspection.

First, a reference sample whose shape has been grasped by additional measurement in advance is prepared. Further, true shape data indicating shape information of this reference sample is prepared (S091). This true shape data is desirably data measured by using a reference shape measuring device whose accuracy is secured, but in a case where machining accuracy of the reference sample is high, CAD data used in machining it is also applicable. This reference sample is not required to have a shape of the crankshaft, and as described later, when the true shape data of the reference sample is superposed on shape information of a reference sample acquired by each of the shape measuring devices 31 to 34, it is sufficient that it is possible to judge that their pieces of shape information match with each other. Further, due to an advance knowledge of the shape of the reference sample, the true shape data indicating the shape information of this reference sample is produced as data having no error between an actual shape and the shape of the reference sample by using an original coordinate system of this true shape data (hereinafter, referred to as a reference sample coordinate system).

Next, the measurement instruction unit 62 outputs a measurement instruction signal to instruct measurement of the reference sample to each of the first mobile device 21 to the fourth mobile device 24 and the first shape measuring device 31 to the fourth shape measuring device 34 (S092). When the measurement instruction signal is inputted, each of the mobile devices 21 to 24 starts moving operation. When the measurement instruction signal is inputted, each of the shape measuring devices 31 to 34 starts measuring operation.

When measurement positions of the first shape measuring device 31 to the fourth shape measuring device 34 are close to each other, there is a possibility of occurrence of error measurement by the projection lights projected from the projection units 311, 321, 331, and 341 interfering with each other. In order to prevent the projection lights projected from the projection units 311, 321, 331, and 341 from interfering with each other, for example, the measurement instruction unit 62 outputs the measurement instruction signal to each of the first mobile device 21 to the fourth mobile device 24 so that they move while being spaced at about 100 mm in the axial direction of the crankshaft S.

Next, shape information indicating part of the reference sample acquired by each of the shape measuring devices 31 to 34 is generated (S093). That is, four pieces of shape information are generated.

The shape information generated by each of the shape measuring devices 31 to 34 has each original coordinate system depending on a position error, an angular error, a measurement error, and the like which each piece thereof has. Hereinafter, this coordinate system is referred to as a shape measuring device-specific coordinate system.

Next, the crankshaft shape information generating unit 63 superposes the true shape data of the reference sample prepared in S091 and the four pieces of shape information indicating part of the reference sample generated in S093 by moving and rotating the shape information indicating part of the reference sample (S094). In this case, due to no error in the true shape data, appropriately performing the movement and the rotation results in that a well superposed position is found.

Next, the crankshaft shape information generating unit 63 finds that what degrees of the movement and the rotation have allowed the four pieces of shape information indicating part of the reference sample to be each superposed by the processing in S094, and finds that what degrees of movement and rotation allow the shape measuring device-specific coordinate system which each of the shape measuring devices 31 to 34 has to match with the reference sample coordinate system (S095). In this case, a parameter indicating "movement" necessary to match each of the shape measuring device-specific coordinate systems with the reference sample coordinate system as three-dimensional data with an X-axis, a Y-axis, and a Z-axis is referred to as "position correction parameter", and a parameter indicating similarly necessary "rotation" as a rotation angle is referred to as "inclination correction parameter". Further, "position correction parameter" and "inclination correction parameter" are also referred to together as "rigid transformation parameter".

Performing the above measurement makes it possible that regardless of a measuring object, the shape information measured by each of the shape measuring devices 31 to 34 is transformed into the reference sample coordinate system by adding the position correction parameter and the inclination correction parameter, resulting in simultaneously superposing each of the four pieces of shape information without error (namely, transforming and combining four pieces of partial shape information into a shape of one integrated measuring object).

Note that the rigid transform parameters including the position correction parameter and the inclination correction parameter are stored in the storage unit 52.

(Crankshaft Shape Inspection in the Embodiment)

Figure 7:
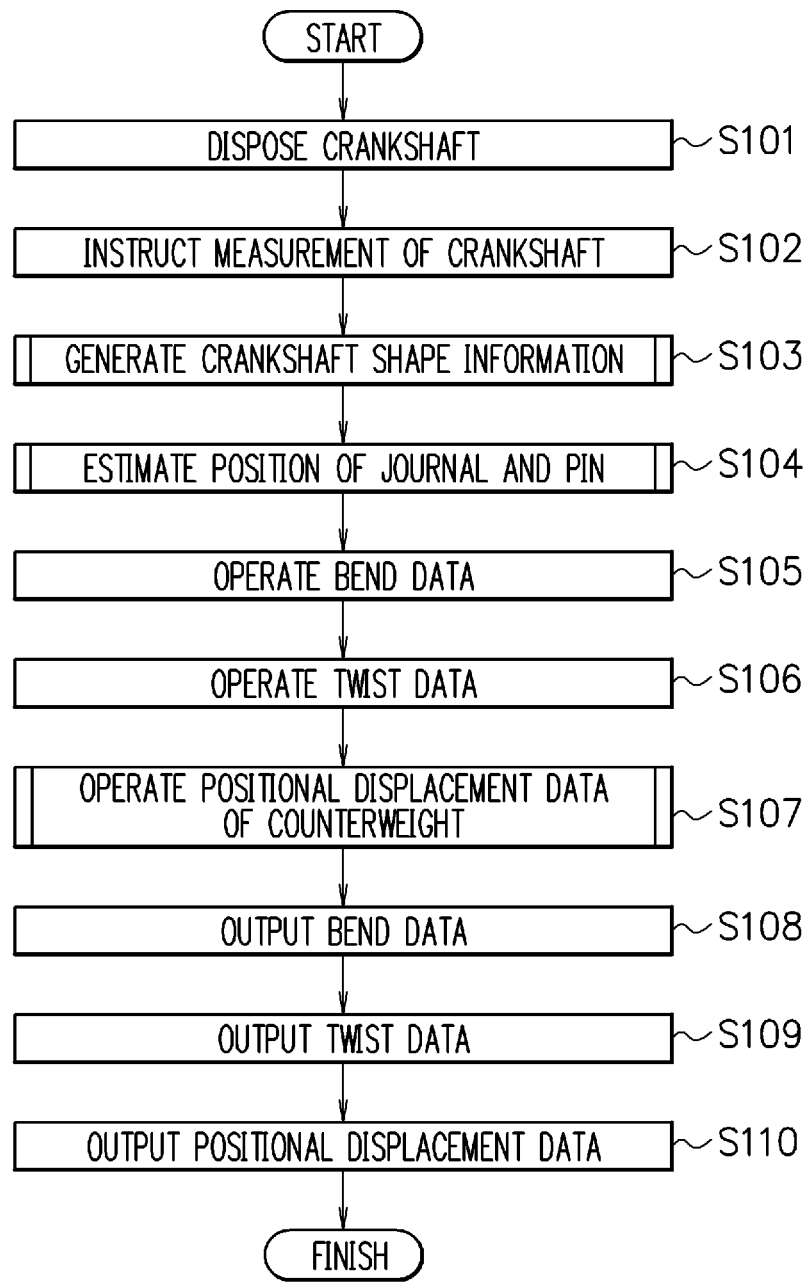
FIG. 7 is a flowchart of arithmetic processing in which the arithmetic unit operates bend data, twist data, and positional displacement data of counterweights.

FIG. 7 is a flowchart of arithmetic processing in which the arithmetic unit 50 operates bend data, twist data, and positional displacement data of counterweights.

First, an operator causes the crankshaft S which is a measuring object to be supported by the support device 10. Thus, the support detection unit 61 acquires the support signal indicating that the crankshaft S has been supported (S101). In response to this, each of the shape measuring devices 31 to 34 moves to a measurement start position.

Next, the measurement instruction unit 62 outputs the measurement instruction signal to instruct the measurement of the crankshaft S to each of the first mobile device 21 to the fourth mobile device 24 and the first shape measuring device 31 to the fourth shape measuring device 34 (S102). When the measurement instruction signal is inputted, each of the mobile devices 21 to 24 starts the moving operation. When the measurement instruction signal is inputted, each of the shape measuring devices 31 to 34 starts the measuring operation.

When the measurement positions of the first shape measuring device 31 to the fourth shape measuring device 34 are close to each other, there is the possibility of the occurrence of the error measurement by the projection lights projected from the projection units 311, 321, 331, and 341 interfering with each other. In order to prevent the projection lights projected from the projection units 311, 321, 331, and 341 from interfering with each other, for example, the measurement instruction unit 62 outputs the measurement instruction signal to each of the first mobile device 21 to the fourth mobile device 24 so that they move while being spaced at about 100 mm in the axial direction of the crankshaft S. For example, when the moving speed of each of the mobile devices 21 to 24 is 100 mm/sec, the measurement instruction unit 62 outputs the measurement instruction signal to each of the mobile devices 21 to 24 at intervals of one second. When each of the mobile devices 21 to 24 is moved at a moving speed of 200 mm/sec in a range of 750 mm obtained by adding 50 mm in a length of the positioning target 90 to 700 mm in a maximum length of the crankshaft S, the shape information of the crankshaft S is acquired in a time of about four seconds for each shape measuring device in a range of a field of view of each of the shape measuring devices 31 to 34.

Note that each of the first shape measuring device 31 to the fourth shape measuring device 34 measures the shape information of the crankshaft S in a field of view of a degree of slightly over 90 degrees with respect to the circumferential direction of the crankshaft S. The shape information acquired by each of the shape measuring devices 31 to 34 is referred to as partial shape information.

Figure 8A:
FIG. 8A is a view illustrating one example of partial shape information acquired by the first shape measuring device.
Figure 8B:
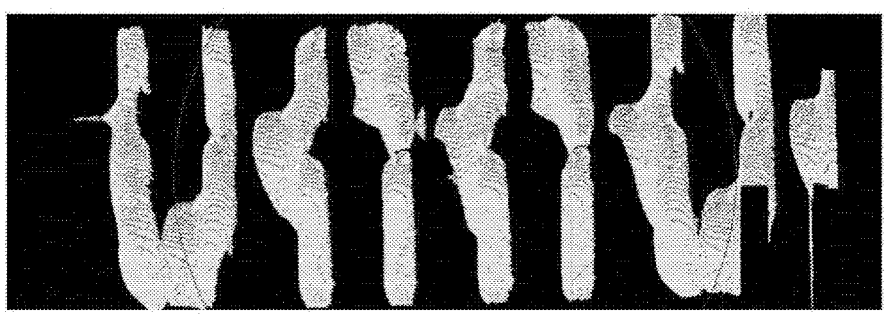
FIG. 8B is a view illustrating one example of partial shape information acquired by a second shape measuring device.
Figure 8C:
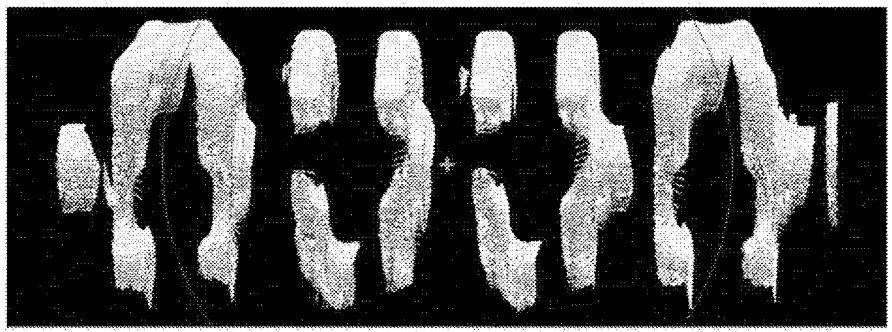
FIG. 8C is a view illustrating one example of partial shape information acquired by a third shape measuring device.
Figure 8D:
FIG. 8D is a view illustrating one example of partial shape information acquired by a fourth shape measuring device.

FIG. 8A is a view illustrating one example of partial shape information acquired by the first shape measuring device 31. FIG. 8B is a view illustrating one example of partial shape information acquired by the second shape measuring device 32. FIG. 8C is a view illustrating one example of partial shape information acquired by the third shape measuring device 33. FIG. 8D is a view illustrating one example of partial shape information acquired by the fourth shape measuring device 34.

Specifically, the partial shape information acquired by each of the shape measuring devices 31 to 34 is three-dimensional point cloud data indicating a partial shape of a surface of the crankshaft S which is the measuring object, and each of points is constituted of three pieces of real number data on an X coordinate, a Y coordinate, and a Z coordinate. The partial shape information acquired by each of the shape measuring devices 31 to 34 is outputted via the cable 71 to the arithmetic unit 50 and stored in the storage unit 52 of the arithmetic unit 50.

Referring to FIG. 7 again, the crankshaft shape information generating unit 63 generates crankshaft shape information indicating a three-dimensional shape of the crankshaft S which is the measuring object (S103). The crankshaft shape information generating unit 63 combines partial shapes corresponding to the respective pieces of the partial shape information acquired by the respective shape measuring devices 31 to 34 by using the rigid transformation parameter of each of the shape measuring devices 31 to 34, and generates the crankshaft shape information.

Figure 9A:
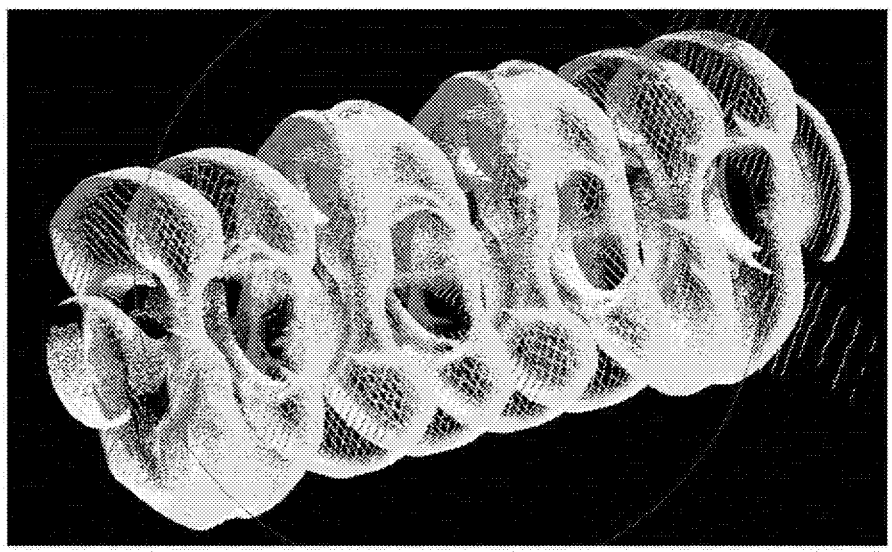
FIG. 9A is a view illustrating a state of superposing partial shapes illustrated in FIG. 8A to FIG. 8D.
Figure 9B:
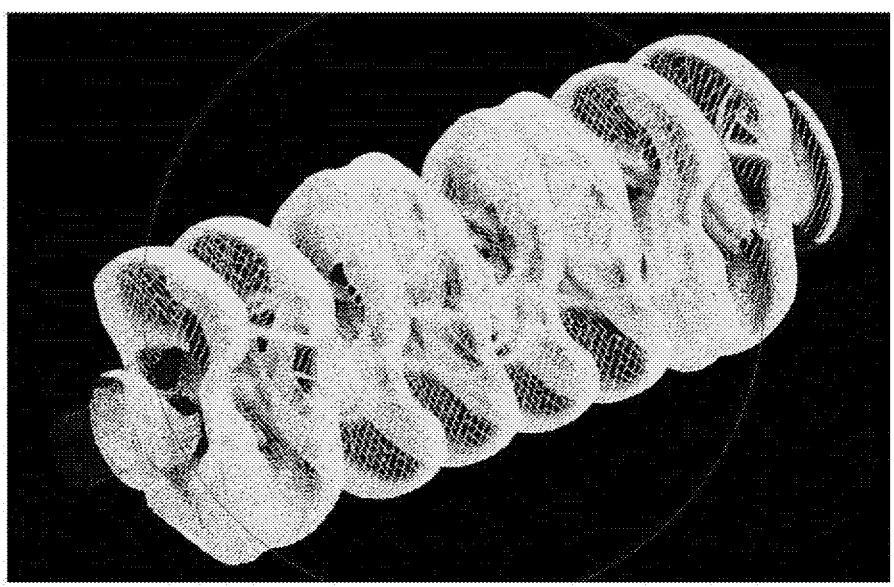
FIG. 9B is a view illustrating a state of combining the superposed partial shapes illustrated in FIG. 9A.

FIG. 9A is a view illustrating a state of superposing the partial shapes acquired by the respective shape measuring devices 31 to 34 illustrated in FIG. 8A to FIG. 8D, and FIG. 9B is a view illustrating a state of combining the superposed partial shapes illustrated in FIG. 9A.

Referring to FIG. 7 again, the position estimation unit 64 estimates each position of the plurality of journal S3 and the plurality of pins S1 in the three-dimensional shape of the crankshaft S corresponding to the crankshaft shape information generated in S103 (S104). When the position estimation unit 64 estimates each position of the plurality of journal S3 and the plurality of pins S1, it uses the reference coordinate information indicating the reference coordinates which are each reference position of the journals S3 and the pins S1. The reference coordinate information is stored in the storage unit 52.

Next, the bend data operation unit 65 operates bend data indicating a bend from the extending direction of the center axis of the crankshaft S from the position of the plurality of journals S3 estimated in S104 (S105). The bend data is a difference between the position of the plurality of journals S3 estimated in S104 and a reference axis center position which is an ideal axis center position found from the reference coordinate information. In general, as the reference axis center position, a straight line connecting the centers of both end journals is used.

Next, the twist data operation unit 66 operates twist data indicating a twist of the crankshaft S from the position of the plurality of pins S1 estimated in S104 (S106). The bend data is each phase of the plurality of pins operated from the position of the plurality of journals S3 estimated in S104 and the reference axis center position. In general, one reference pin is fixed, and a determination is made by a relative angle in setting the reference pin angle to "0" (zero) degrees.

Next, the positional displacement data operation unit 67 estimates each position of the plurality of counterweights S2 in the three-dimensional shape of the crankshaft S corresponding to the crankshaft shape information generated in S103 and operates the positional displacement data indicating the positional displacement of these plurality of counterweights S2 (S107). When the positional displacement data operation unit 67 estimates each position of the plurality of counterweights S2, it uses the reference coordinate information indicating the reference coordinates which are each reference position of the counterweights S2. The reference coordinate information is stored in the storage unit 52.

Next, the bend data output unit 68 outputs the bend data operated in S105 (S108), the twist data output unit 69 outputs the twist data operated in S106 (S109), and the positional displacement data output unit 70 outputs the positional displacement data of the counterweights S2 operated in S107 (S110).

Note that the operation order of Steps S105 to S107 and the output order of Steps S108 to S110 are not limited to the above. For example, Steps S105 and S106 may be executed after Step S107, or Steps S105, S106, and S107 may be executed in parallel.

FIG. 10 is a view for explaining processing in S103 (generation processing of the shape information of the crankshaft) illustrated in FIG. 7 in more detail.

In FIG. 10, with respect to the partial shape information acquired by the first shape measuring device 31 and the second shape measuring device 32 (referred to as a first partial shape information 802 and a second partial shape information 803 respectively), the crankshaft shape information generating unit 63 matches the coordinate systems of the first partial shape information 802 and the second partial shape information 803 with the reference sample coordinate system by using the rigid transformation parameters found in advance. Similarly, also regarding the partial shape information acquired by the third shape measuring device 33 and the fourth shape measuring device 34 (not illustrated but referred to as a third partial shape information 804 and a fourth partial shape information 805 respectively), the crankshaft shape information generating unit 63 matches the third partial shape information 804 and the fourth partial shape information 805 with the reference sample coordinate system by using the rigid transformation parameters found in advance. As a result, the first partial shape information 802 to the fourth partial shape information 805 are combined into a shape 801 of the crankshaft S which is the measuring object.

When the positioning target 90 is used, the crankshaft shape information is generated so as to include the positioning target 90. Then, a position in a rotation axis direction of the positioning target 90 in the partial shape information obtained by each of the shape measuring devices 31 to 34 is operated by superposition processing of the true shape data, and the position in the rotation axis direction is corrected so as to eliminate a difference between the respective pieces of the partial shape information.

Based on the shape information of the crankshaft S which is the measuring object when the first partial shape information 802 to the fourth partial shape information 805 are combined by using the rigid transformation parameters, coordinate information including positions of the plurality of journals S3 and the plurality of pins S1 on the crankshaft S which is the measuring object is acquired, and the coordinate information is stored in the storage unit 52.

FIG. 11 is a flowchart for explaining processing in S104 (estimation processing of the positions of the journals and the pins) illustrated in FIG. 7 in more detail.

First, the fitting area extracting unit 641 extracts three-dimensional point cloud data located in each inside of a plurality of fitting areas referring to the coordinate information of the crankshaft S which is the measuring object stored in the storage unit 52 (S201). The coordinate information of the crankshaft S which is the measuring object is, for example, coordinates in the axial direction of each of the journals S3 and each of the pins S1 and is determined based on the product design drawing. By using the coordinate information, the three-dimensional point cloud data corresponding to each of the journals S3 and each of the pins S1 can be divided to be extracted.

Next, to the three-dimensional point cloud data located in each inside of the plurality of fitting areas, the fitting unit

642 subjects a columnar shape having a length and a diameter corresponding to each of the journals S3 and the pins S1 to the fitting (S202). The fitting unit 642 estimates three-dimensional point cloud data located inside fitting areas which have been extracted referring to the reference coordinate information stored in the storage unit 52 as point cloud data corresponding to the plurality of journals S3 and the plurality of pins S1. As preprocessing of the fitting, deleting point cloud data of portions corresponding to fins makes it possible to subject the columnar shapes to the fitting without being affected by sizes of the fins.

FIG. 12A is a view illustrating one example of three-dimensional data of a crankshaft in which the fitting areas have been extracted by the processing in S201, and FIG. 12B is a view illustrating one example of three-dimensional data of the crankshaft in which the columnar shapes have been subjected to the fitting by the processing in S202. In FIG. 12A, arrows A indicate the fitting areas extracted as the pins, and arrows B indicate the fitting areas extracted as the journals. In FIG. 12B, arrows C indicate the fitting areas in which the columnar shapes have been subjected to the fitting as the pins, and arrows D indicate the fitting areas in which the columnar shapes have been subjected to the fitting as the journals.

In one example, a width of the fitting area indicated by the arrow A in FIG. 12A is 10 mm. The fitting area extracting unit 641 extracts the three-dimensional point cloud data located inside the 10 mm width fitting areas. The fitting unit 642 subjects the columnar shapes to the fitting so as to correspond to a disposition of the three-dimensional point cloud data located inside the fitting areas.

Referring to FIG. 11 again, the center position operation unit 643 operates a center position of the columnar shape subjected to fitting to each of the plurality of journals S3 and the plurality of pins S1 in S202 (S203).

Next, the position determination unit 644 determines the center position of the columnar shape operated in S203 in a position of each of the plurality of journals S3 and the plurality of pins S1 (S204).

A difference between coordinates indicating the position of each of the plurality of journals S3 and coordinates indicating the reference axis center position is operated as the bend data in the processing in S105. A phase of each of the plurality of pins operated from coordinates indicating the position of each of the plurality of pins S1, the coordinates indicating the reference axis center position, and the reference axis center position is operated as the twist data in the processing in S106. In one example, the reference axis center position is an axial line of the crankshaft acquired by extracting a regression line with respect to center coordinates of the plurality of journals. The position estimation unit 64 estimates the centers of the columnar shapes subjected to the fitting as the positions of the journals S3 and the pins S1, thereby allowing accurate estimation of the positions of the journals S3 and the pins S1 even in a case of some lack of the three-dimensional point cloud data.

Figure 13:
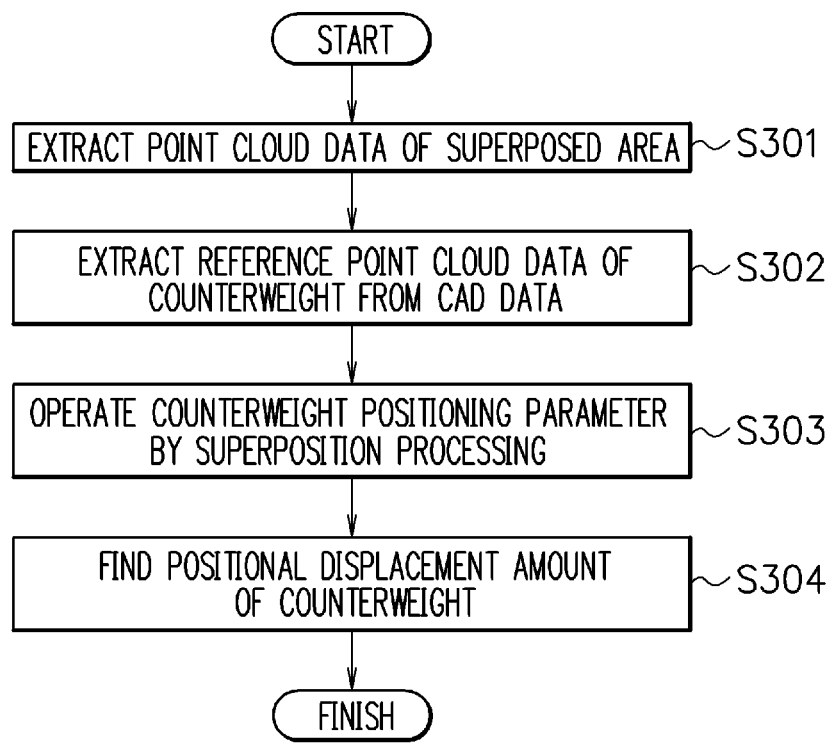
FIG. 13 is a flowchart for explaining processing in S107 illustrated in FIG. 7.

FIG. 13 is a flowchart for explaining the processing in S107 (the arithmetic processing of the positional displacement data of the counterweights) illustrated in FIG. 7 in more detail.

First, the superposed area extracting unit 671 extracts three-dimensional point cloud data in a plurality of counterweight areas referring to the coordinate information of the crankshaft S which is the measuring object stored in the storage unit 52 (S301). The coordinate information of the crankshaft S which is the measuring object is coordinates and an angle in the axial direction of each of the counterweights S2 and is determined based on the product design drawing. By using the coordinate information, the three-dimensional point cloud data corresponding to each of the counterweights S2 can be divided to be extracted.

Further, the superposed area extracting unit 671 extracts reference three-dimensional point cloud data of the corresponding counterweights S2 also from CAD data based on the product design drawing of the crankshaft S (S302). The reference three-dimensional point cloud data of the counterweights S2 corresponds to reference data of the counterweights mentioned in the present invention.

Next, the superposition processing unit 672 calculates a counterweight positioning parameter when the three-dimensional point cloud data corresponding to each of the counterweights S2 is superposed on the reference three-dimensional point cloud data, and executes superposition processing (S303). The counterweight positioning parameter is operated by the superposition of the three-dimensional point cloud data corresponding to the counterweights S2 and the reference three-dimensional point cloud data, for example, is calculated based on a position where the sum of distances between pieces of the mutual data becomes minimum.

Next, the positional displacement data operation unit 673 finds a positional displacement amount of the counterweights S2 by correcting a movement amount in the rotation axis direction of the crankshaft S in the counterweight positioning parameter so as to set a reference counterweight position as an origin (S304).

Figure 14:
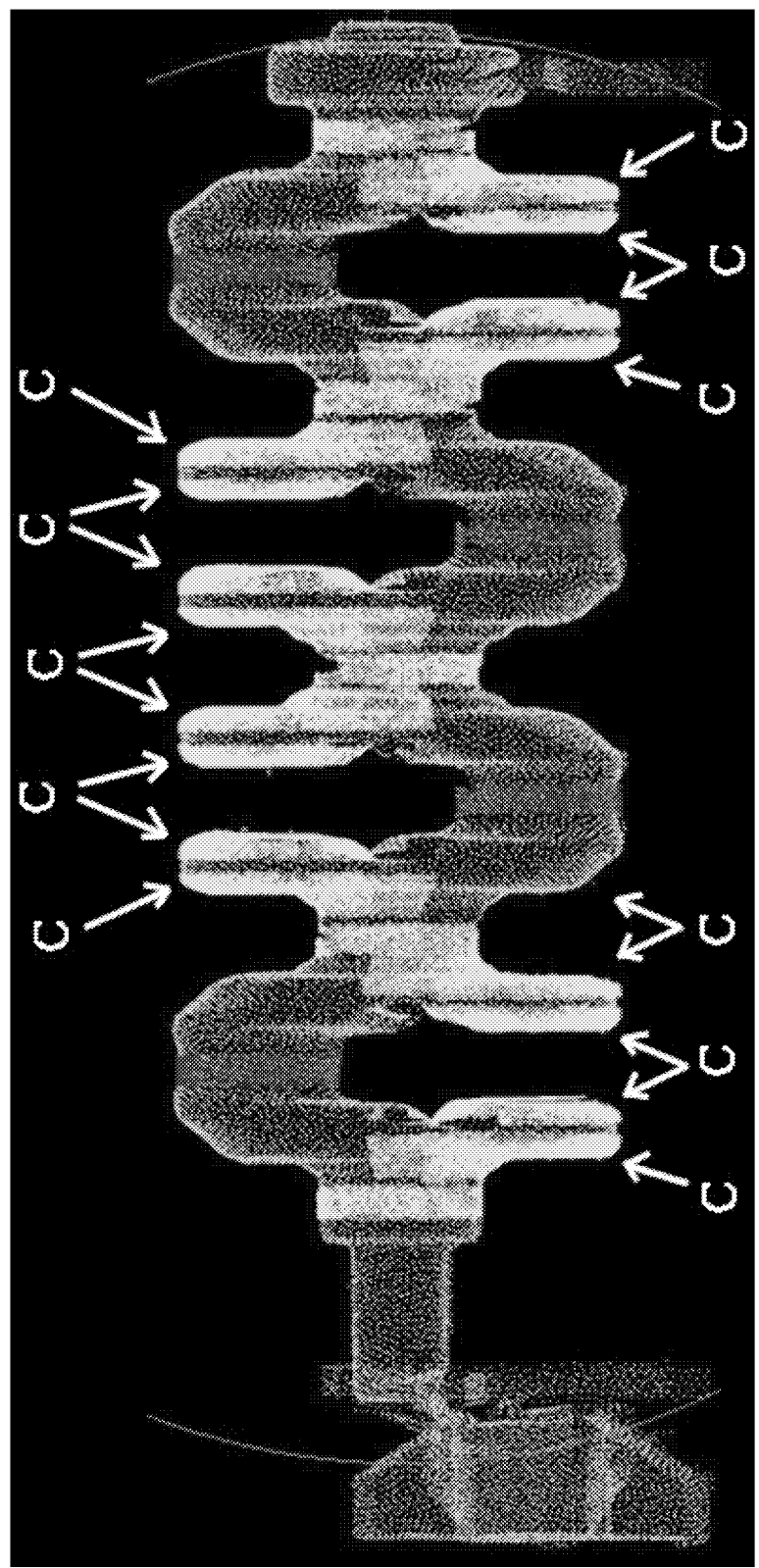
FIG. 14 is a view illustrating one example of three-dimensional data of a crankshaft in which superposed areas have been extracted by processing in S301 illustrated in FIG. 13.

FIG. 14 is a view illustrating one example of three-dimensional data of a crankshaft in which superposed areas have been extracted by the processing in S301. Arrows C indicate the superposed areas extracted as the counterweights. In one example, a width of the superposed area is 14 mm. The superposed area extracting unit 671 extracts the three-dimensional point cloud data located inside the 14 mm width superposed areas. The superposition processing unit 672 performs the superposition processing with the reference data of the counterweights in which the superposed areas have been extracted by the processing in S302. According to this embodiment, since positions of the counterweights of the crankshaft S can be measured precisely, it is found that information related to a shape such as a tilting of the counterweights can be acquired.

(Operation and Effect of the Crankshaft Shape Inspection in the Embodiment)

The crankshaft shape inspection apparatus 1 according to the embodiment acquires the partial shape information of the crankshaft S by moving the four first shape measuring device 31 to fourth shape measuring device 34 disposed around the crankshaft S in one direction. This makes it possible to measure the three-dimensional shape of the crankshaft S accurately in a short time without reciprocating the shape measuring devices 31 to 34 in the axial direction of the crankshaft S and further without relatively rotating the shape measuring devices in the circumferential direction of the crankshaft S.

In addition, the crankshaft shape inspection apparatus 1 can acquire the partial shape information corresponding to the whole circumference and front surfaces of the side surfaces in the X positive direction and the side surfaces in the X negative direction of the crankshaft S (including both side surfaces in the X direction of the counterweights S2) with the first shape measuring device 31 to the fourth shape measuring device 34.

Comparative Example 1

Figure 15A:
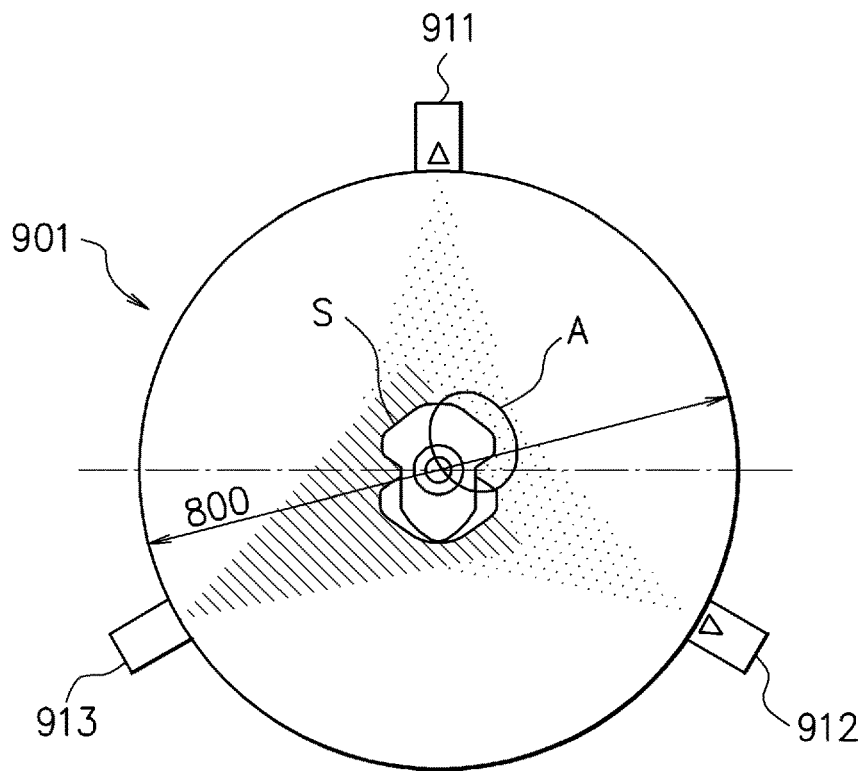
FIG. 15A is a view illustrating an example in which partial shape information of a crankshaft is acquired by a crankshaft shape inspection apparatus in Comparative example.
Figure 15B:
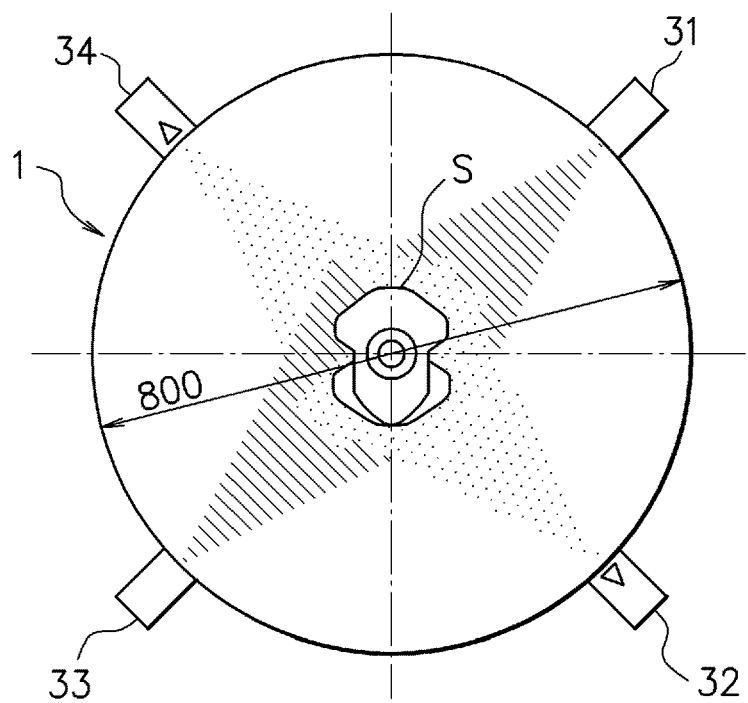
FIG. 15B is a view illustrating an example in which partial shape information of the crankshaft is acquired by the crankshaft shape inspection apparatus according to the embodiment.

FIG. 15A is a view illustrating an example in which partial shape information of the crankshaft S is acquired by a crankshaft shape inspection apparatus 901 including three shape measuring devices as a comparative example. FIG. 15B is a view illustrating an example in which partial shape information of the crankshaft S is acquired by the crankshaft shape inspection apparatus 1 according to the embodiment.

The crankshaft shape inspection apparatus 901 includes a first shape measuring device 911 to a third shape measuring device 913. The first shape measuring device 911 to the third shape measuring device 913 are disposed so as to be located on a 800 mm diameter circle with phases displaced by 120 degrees from each other in the circumferential direction of the crankshaft S. The first shape measuring device 911 and the second shape measuring device 912 are each disposed so that a projection light axis and a light-receiving axis face to one side surfaces in the X direction of the counterweights. On the other hand, the third shape measuring device 913 is disposed so that a projection light axis and a light-receiving axis face to the other side surfaces in the X direction of the counterweights.

Since the crankshaft shape inspection apparatus 901 acquires the partial shape information of the crankshaft S by using the three first shape measuring device 911 to third shape measuring device 913, it is not possible to sufficiently acquire shape information of part (an area indicated by an arrow A) of the whole circumference of the crankshaft S, particularly shape information of part of the other side surfaces in the X direction of the counterweights S2 and journals S3.

In contrast to that, since the crankshaft shape inspection apparatus 1 acquires a three-dimensional shape of the crankshaft S by using the four first shape measuring device 31 to fourth shape measuring device 34, it is possible to acquire the partial shape information (including both side surfaces of the counterweights S2) of the whole circumference of the crankshaft S.

Comparative Example 2

Figure 16A:
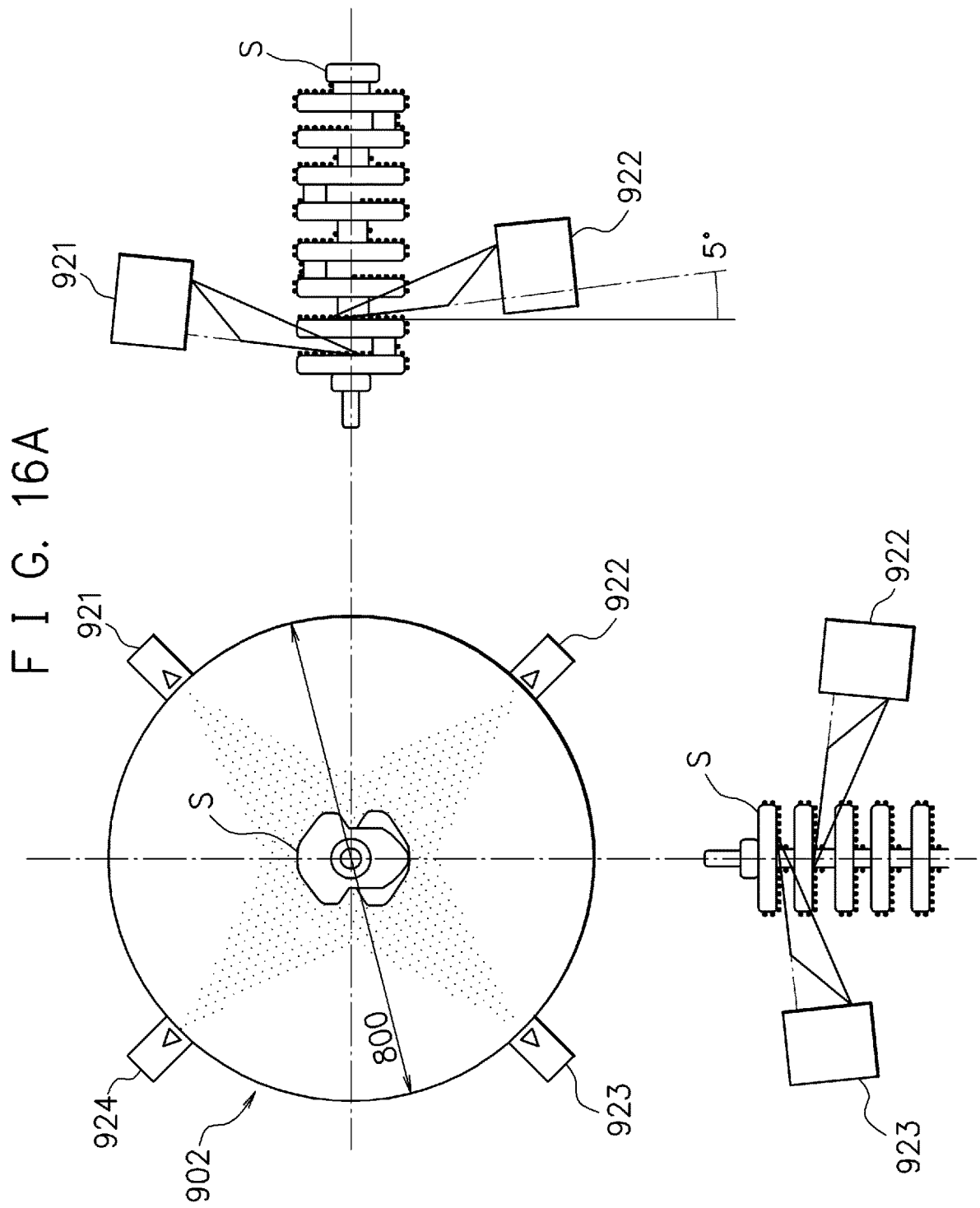
FIG. 16A is a view illustrating an example in which partial shape information of the crankshaft is acquired by a crankshaft shape inspection apparatus in Comparative example.
Figure 16B:
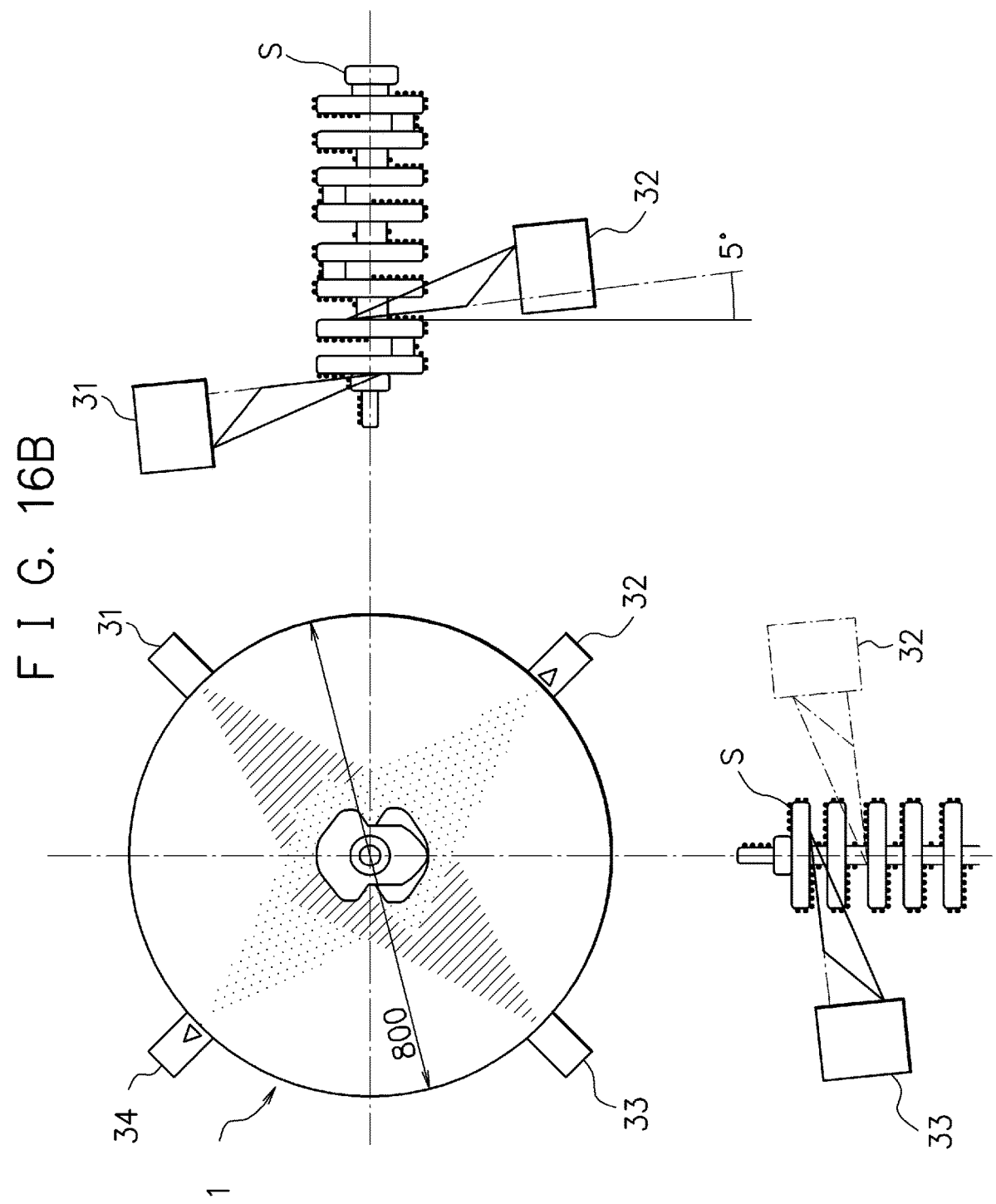
FIG. 16B is a view illustrating an example in which partial shape information of the crankshaft is acquired by the crankshaft shape inspection apparatus according to the embodiment.

FIG. 16A is a view illustrating an example in which partial shape information of the crankshaft S is acquired by a crankshaft shape inspection apparatus 902 which includes four shape measuring devices but in which all their projection light axes and light-receiving axes are inclined so as to face to the same direction (so that all of them face only to one side surfaces in the X direction of the counterweights) as a comparative example. FIG. 16B is a view illustrating an example in which partial shape information of the crankshaft S is acquired by the crankshaft shape inspection apparatus 1 according to the embodiment.

The crankshaft shape inspection apparatus 902 includes a first shape measuring device 921 to a fourth shape measuring device 924. The first shape measuring device 921 to the fourth shape measuring device 924 are disposed so as to be located on a 800 mm diameter circle with phases displaced by 90 degrees from each other in the circumferential direction of the crankshaft S.

In the crankshaft shape inspection apparatus 902, since a projection light axis and a light-receiving axis of each of the four shape measuring devices are inclined so as to face to the same direction, it is not possible to sufficiently acquire shape information of one-side surfaces (one side surfaces in the X direction) of the counterweights S2 and shape information of part of the pins S1 and part of the journals S3 hidden by the counterweights S2.

In contrast to that, since the crankshaft shape inspection apparatus 1 includes two shape measuring devices in each of which a projection light axis and a light-receiving axis are inclined so as to face in one X direction and two shape measuring devices in each of which a projection light axis and a light-receiving axis are inclined so as to face in the other X direction, it is possible to sufficiently acquire shape information of both side surfaces of the counterweights S2.

Comparative Example 3

Figure 17A:
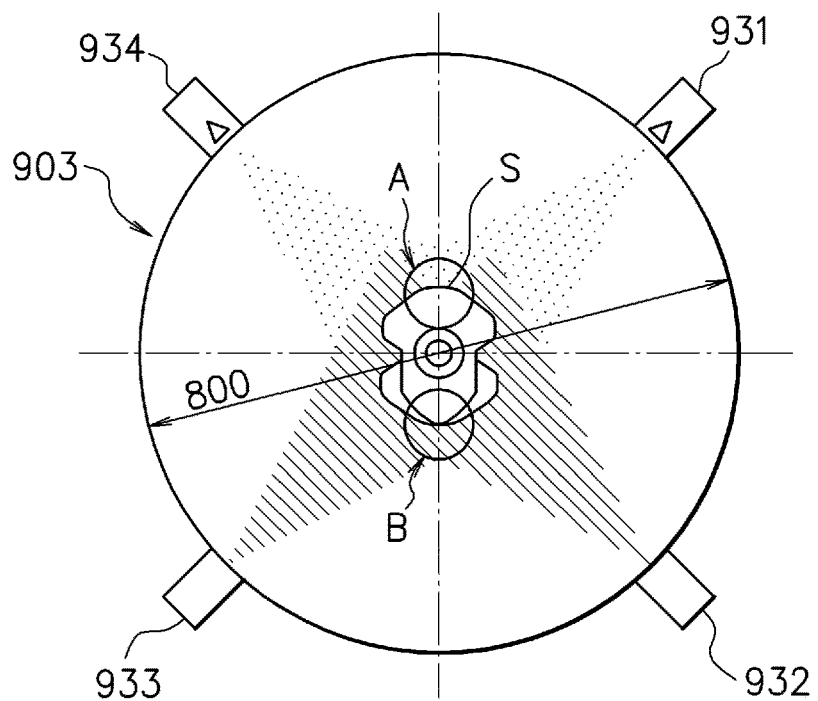
FIG. 17A is a view illustrating an example in which partial shape information of the crankshaft is acquired by a crankshaft shape inspection apparatus in Comparative example.
Figure 17B:
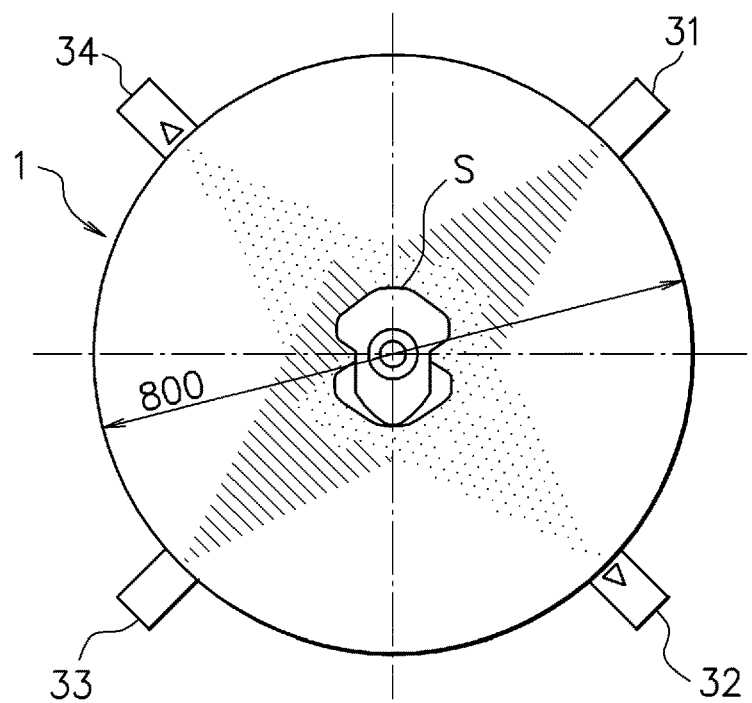
FIG. 17B is a view illustrating an example in which partial shape information of the crankshaft is acquired by the crankshaft shape inspection apparatus according to the embodiment.

FIG. 17A is a view illustrating an example in which partial shape information of the crankshaft S is acquired by a crankshaft shape inspection apparatus 903 which includes four shape measuring devices but in which a projection light axis and a light-receiving axis of each of two adjacent shape measuring devices are inclined so as to face in one X direction and a projection light axis and a light-receiving axis of each of the two remaining adjacent shape measuring devices are inclined so as to face in the other X direction as a comparative example. FIG. 17B is a view illustrating an example in which partial shape information of the crankshaft S is acquired by the crankshaft shape inspection apparatus 1 according to the embodiment.

The crankshaft shape inspection apparatus 903 includes a first shape measuring device 931 to a fourth shape measuring device 934. The first shape measuring device 931 to the fourth shape measuring device 934 are disposed so as to be located on a 800 mm diameter circle with phases displaced by 90 degrees from each other in the circumferential direction of the crankshaft S. In each of the first shape measuring device 931 and the fourth shape measuring device 934, its projection light axis and light-receiving axis are inclined so as to face to one side surfaces in the X direction of the counterweights. On the other hand, in each of the second shape measuring device 932 and the third shape measuring device 933, its projection light axis and light-receiving axis are inclined so as to face to the other side surfaces in the X direction of the counterweights.

It is not possible for the crankshaft shape inspection apparatus 903 to sufficiently acquire shape information of part (areas indicated by an arrow A and an arrow B) of the whole circumference of the crankshaft S, particularly shape information of part of side surfaces of the counterweights S2 and the journals S3.

In contrast to that, in the crankshaft shape inspection apparatus 1, since two shape measuring devices in each of which a projection light axis and a light-receiving axis are inclined so as to face in one X direction and two shape measuring devices in each of which a projection light axis and a light-receiving axis are inclined so as to face in the other X direction are disposed so as to be alternate with each other, it is possible to sufficiently acquire shape information of both side surfaces of the counterweights S2 and the journals S3.

FIG. 18A is a view illustrating a three-dimensional shape of the crankshaft S generated by the crankshaft shape inspection apparatus 902 illustrated in FIG. 16A, and FIG. 18B is a view illustrating a three-dimensional shape of the crankshaft S generated by the crankshaft shape inspection apparatus 1.

As illustrated in FIG. 18A, in the three-dimensional shape of the crankshaft S generated by the crankshaft shape inspection apparatus 902, as indicated by arrows A, part of one-side surfaces of the pins S1 is not acquired. In addition, in the three-dimensional shape of the crankshaft S generated by the crankshaft shape inspection apparatus 902, as indicated by arrows B, part of one-side surfaces of the counterweights S2 is not acquired. In addition, in the three-dimensional shape of the crankshaft S generated by the crankshaft shape inspection apparatus 902, as indicated by arrows C, part of the journals S3 is not acquired. In contrast to that, as illustrated in FIG. 18B, the three-dimensional shape of the crankshaft S generated by the crankshaft shape inspection apparatus 1 is acquired over substantially all of the pins S1, both side surfaces of the counterweights S2, and substantially all of the journals S3.

Note that four shape measuring devices are used in the embodiment, but the three-dimensional shape of the crankshaft S may be acquired by using five or more shape measuring devices. Also in that case, two or more shape measuring devices in each of which a projection light axis and a light-receiving axis are inclined so as to face in one axis direction of the crankshaft S and two or more shape measuring devices in each of which a projection light axis and a light-receiving axis are inclined so as to face in the other axis direction of the crankshaft S are included.

Example

Figure 21:
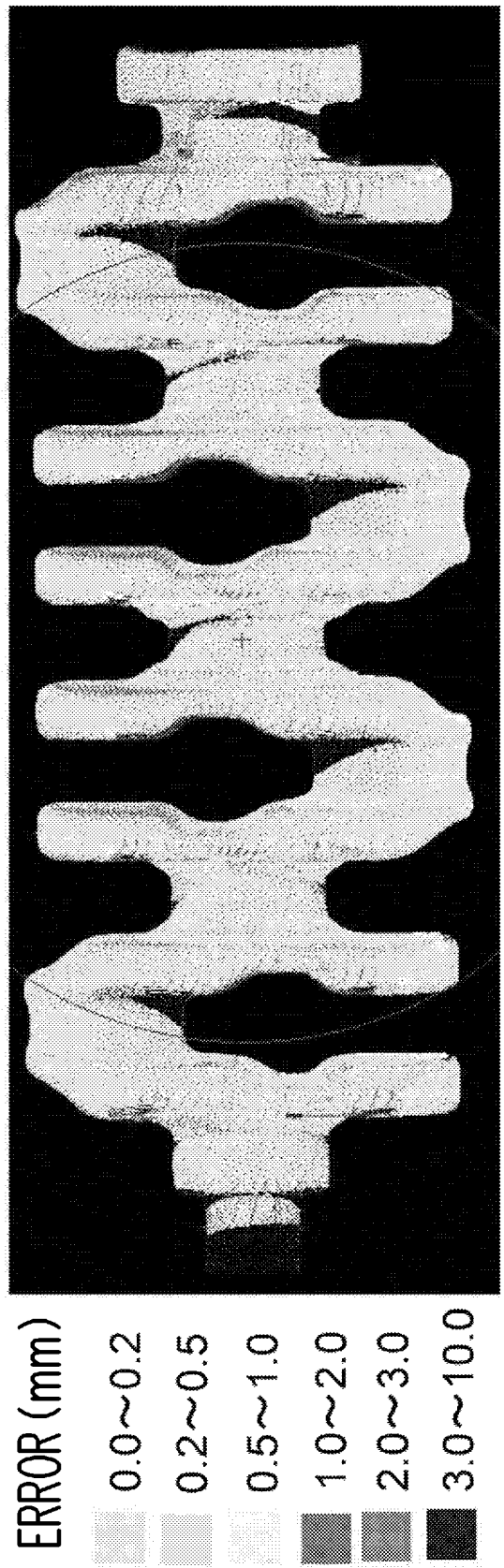
FIG. 21 is a view illustrating differences between a three-dimensional shape of the crankshaft corresponding to crankshaft shape information generated in Example and actual measured values obtained by measuring the same crankshaft with a coordinate measuring machine.
Figure 22:
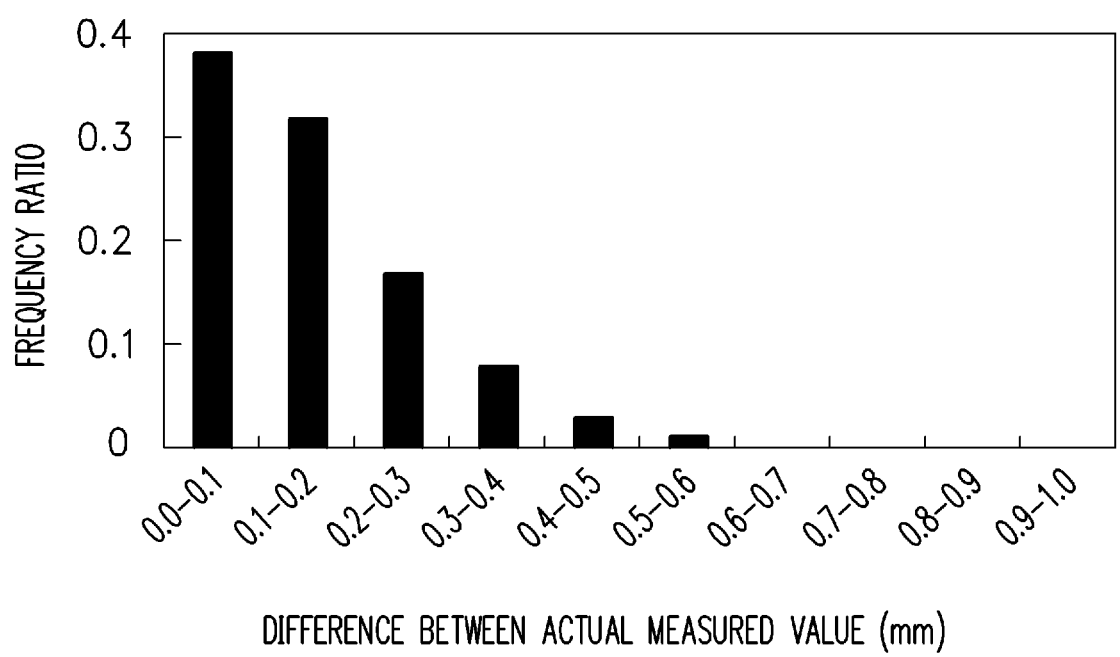
FIG. 22 is a chart illustrating the differences illustrated in FIG. 21.

FIG. 21 is a view illustrating differences between a three-dimensional shape of the crankshaft corresponding to crankshaft shape information generated by processing in S103 by using the crankshaft shape inspection system according to the embodiment and actual measured values obtained by measuring the same crankshaft with a coordinate measuring machine. FIG. 22 is a chart illustrating the differences illustrated in FIG. 21. As the coordinate measuring machine, CNC Coordinate Measuring Machine CRYSTA-APEX manufactured by Mitutoyo Corporation was used.

The differences between the three-dimensional shape of the crankshaft corresponding to the crankshaft shape information generated by the processing in S103 and the actual measured values are each 0.1 mm or less in approximately 40% of the total and 0.2 mm in approximately 70% of the total. Further, a portion where the difference is 0.4 mm or more is less than 10%, and the three-dimensional shape of the crankshaft generated in Example closely corresponds with the actual measured values.

Figure 24:
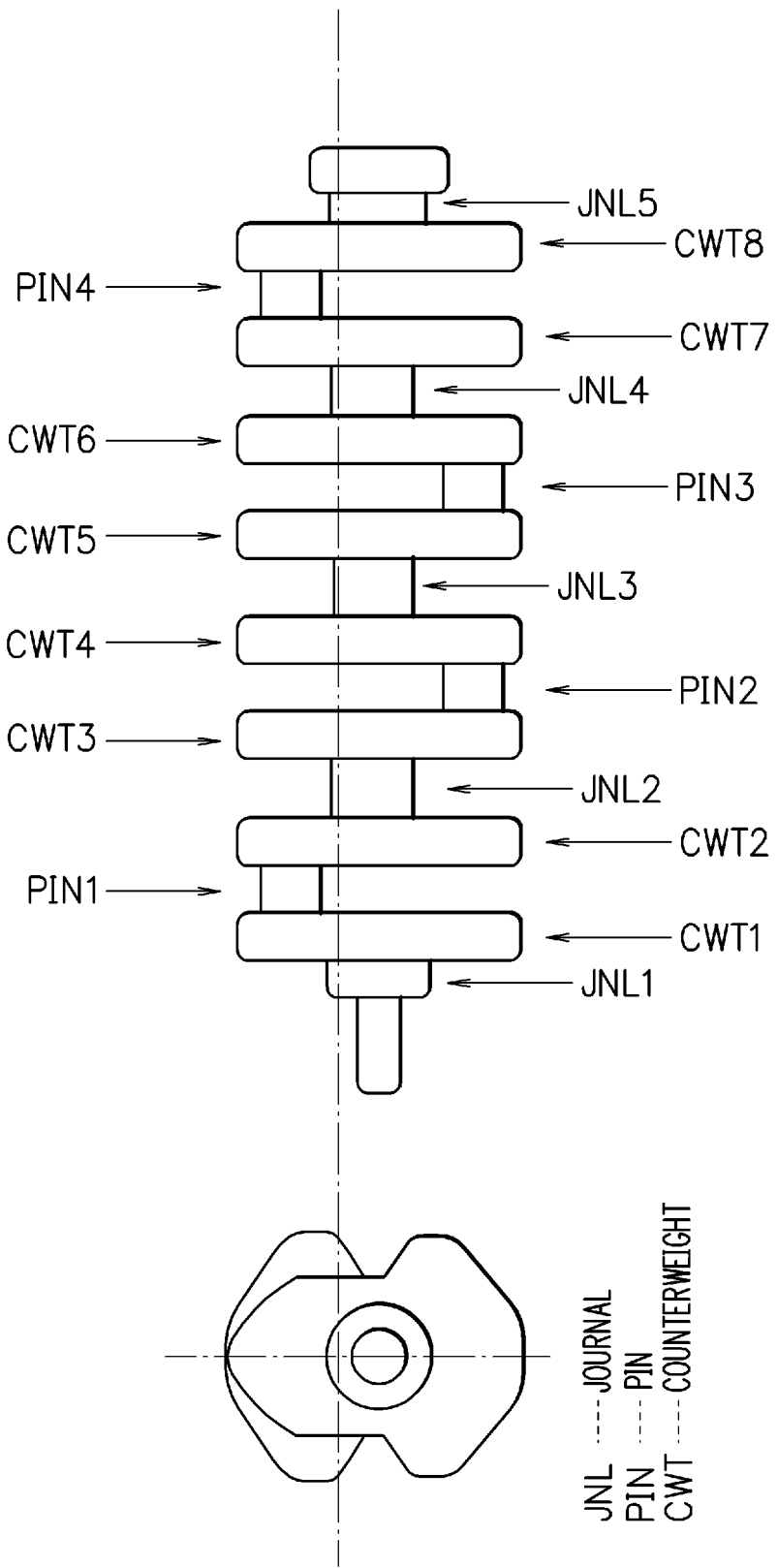
FIG. 24 is a view illustrating measured portions of the crankshaft in Example.

FIG. 23 is a chart illustrating bend data and twist data operated in Example. In FIG. 23, "MEASURED PORTION" corresponds to each of the portions of the crankshaft illustrated in FIG. 24. Further, "COLUMN FITTING RESULT" indicates an X coordinate, a Y coordinate, and a Z coordinate in a center position and a radius of a columnar shape subjected to fitting to each of the measured portions. "AXIAL CORE" indicates a Y coordinate and a Z coordinate of an axial core of a not-illustrated reference crankshaft. "BEND" is bend data indicating relative coordinates with respect to "AXIAL CORE" in the center position of the columnar shape subjected to the fitting. "BEND y" indicates a relative Y coordinate with respect to "AXIAL CORE" in the center position of the columnar shape subjected to the fitting, and "BEND z" indicates a relative Z coordinate with respect to "AXIAL CORE" in the center position of the columnar shape subjected to the fitting. "TWIST" is bend data indicating a phase when "AXIAL CORE" in the center position of the columnar shape subjected to the fitting is set as the center of circle. The axial core is set as a straight line connecting the centers of journals JNL1 and JNL5.

In the example illustrated in FIG. 23, 0.15 mm of a bend in a Z direction of a measured portion "JNL2" is a maximum bend. At the same time, in the twist, since in a case of no twist, phases of measured portions "PIN1" and "PIN4" are each "0" (zero) degrees and phases of measured portions "PIN2" and "PIN3" are each 180 degrees, a maximum twist is 0.40 degrees of a twist of the measured portion "PIN3".

FIG. 25 is a chart illustrating positional displacement amounts of counterweights operated by using the crankshaft shape inspection system according to the embodiment. In FIG. 25, "measured portion" corresponds to each of the portions of the crankshaft illustrated in FIG. 24. In addition, "counterweight positional displacement" indicates displacement amounts from CAD data in an X axis direction by dividing each of the counterweights into "left side surface" (corresponding to a side surface in an X positive direction) and "right side surface" (corresponding to a side surface in an X negative direction).

Figure 26A:
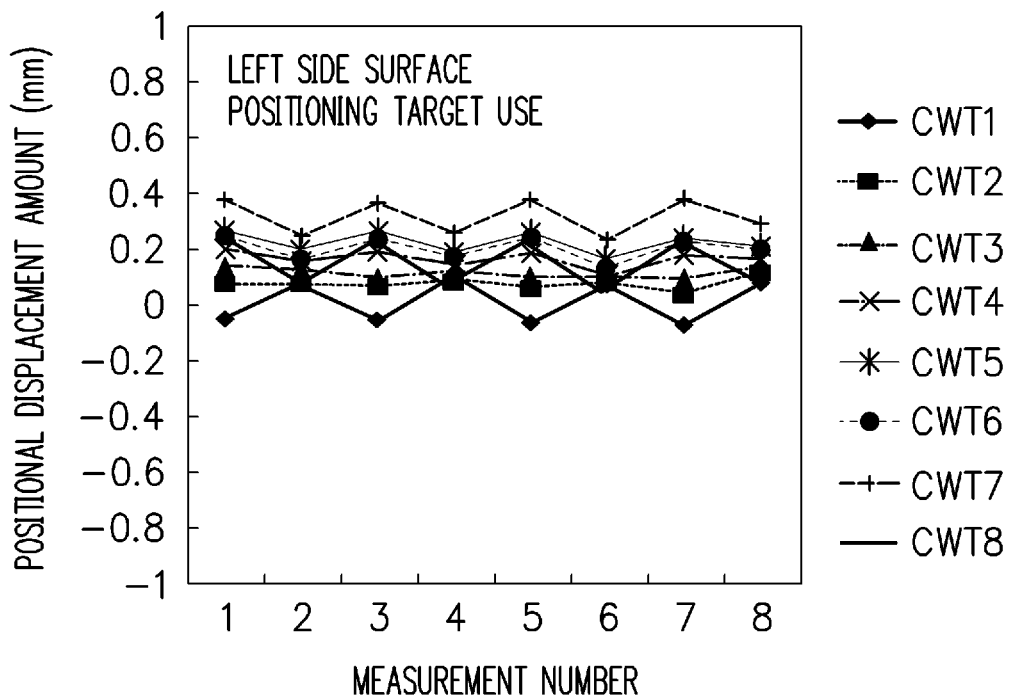
FIG. 26A is a chart illustrating positional displacement amounts of the counterweights when the positioning target is used in Example.
Figure 26B:
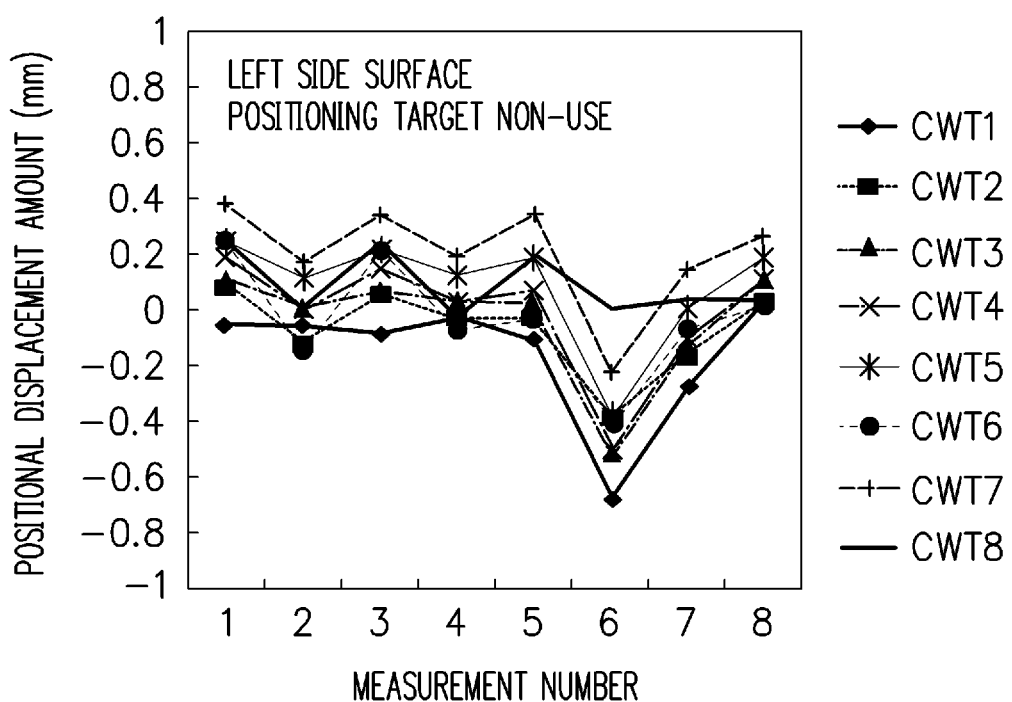
FIG. 26B is a chart illustrating positional displacement amounts of the counterweights when the positioning target is not used in Example.

FIG. 26A and FIG. 26B are charts illustrating positional displacement of the counterweights operated when the positioning target 90 is set as use/non-use and the same samples are repeatedly measured eight times in the crankshaft shape inspection system according to the embodiment. When the positioning target 90 is not used, there is a variation of about 0.6 mm at the maximum. On the other hand, when the positioning target 90 is used, a measurement variation is suppressed by about 0.1 mm.

Hereinabove, the present invention is described with an embodiment, but the above-described embodiment merely illustrates concrete examples of implementing the present invention, and the technical scope of the present invention is not to be construed in a restrictive manner by these embodiments. That is, the present invention may be implemented in various forms without departing from the technical spirit or main feature thereof.

Further, the present invention can be achieved by providing software (program) to achieve various pieces of processing such as crankshaft shape information generation, position estimation, a bend data operation, a twist data operation, and a positional displacement data operation of counterweights for a system or an apparatus via a network or various storage mediums and also by reading out and executing the program with a computer of the system or the apparatus.

INDUSTRIAL APPLICABILITY

In the present invention, with a crankshaft being an object, regardless of presence/absence of a partial defect of the crankshaft, it is possible to accurately inspect a shape of the crankshaft, for example, a bend and a twist of the crankshaft, and positional displacement of counterweights in a short time.

The invention claimed is:
1. A crankshaft shape inspection apparatus comprising:
a support, including a base, which supports a crankshaft having a plurality of journals, a plurality of pins, and a plurality of counterweights disposed between the journals and the pins; and
four or more shape measuring devices which each have a projector which projects light and a camera which receives light projected by the projector, are disposed around the crankshaft supported by the support, and acquire partial shape information indicating a partial shape of the crankshaft,
wherein the crankshaft supported by the support and the four or more shape measuring devices are relatively movable in an axial direction of the crankshaft,
wherein the four or more shape measuring devices are divided into shape measuring devices in a first group which acquire the partial shape information including one side surfaces of the counterweights in an axial direction of the crankshaft and shape measuring devices in a second group which acquire the partial shape information including other side surfaces of the counterweights in an axial direction of the crankshaft, and wherein the shape measuring devices in the second group are each disposed between the shape measuring devices in the first group in a circumferential direction of the crankshaft.

2. The crankshaft shape inspection apparatus according to claim 1, wherein the four or more shape measuring devices are disposed at equal intervals in a circumferential direction of the crankshaft.

3. The crankshaft shape inspection apparatus according to claim 1, wherein the projector and the camera are disposed side by side in an axial direction of the crankshaft and satisfy $\beta < \alpha + \beta < \arctan(a/b)$, here, $\alpha$ is an angle between a light path of projection light projected from the projector and a light path of incident light incident to the camera when a shape of the journal is measured, $\beta$ is an inclination angle of a light path closer to a direction orthogonal to an axial direction of the crankshaft between the light path of the projector and the light path of the camera with respect to a direction orthogonal to an axial direction of the crankshaft, a is a length of the journal, and b is a length between an end portion of the counterweight and the journal.

4. The crankshaft shape inspection apparatus according to claim 1, wherein a positioning target having a predetermined shape is disposed on an extension of an axial direction of the crankshaft.

5. A crankshaft shape inspection system comprising:

the crankshaft shape inspection apparatus according to claim 1; and at least one processor configured to combine the partial shape information acquired by the crankshaft shape inspection apparatus and generates crankshaft shape information indicating a three-dimensional shape of the crankshaft.

6. The crankshaft shape inspection system according to claim 5, wherein the at least one processor is further configured to, based on the crankshaft shape information and reference data of counterweights prepared in advance, operate data related to the counterweights.

7. The crankshaft shape inspection system according to claim 6 comprising a storage which stores reference coordinate information indicating coordinates which are a reference position of the plurality of counterweights, wherein the at least one processor is further configured to estimate each position of the plurality of counterweights in the crankshaft shape information by using the reference coordinates stored in the storage and operates positional displacement data indicating positional displacement of the plurality of counterweights based on reference data of the counterweights.

8. The crankshaft shape inspection system according to claim 5 comprising:

a storage which stores reference coordinate information indicating coordinates which are reference positions of the plurality of journals and the plurality of pins;

wherein the at least one processor is further configured to:

estimate each position of the plurality of journals and the plurality of pins in the crankshaft shape information by using the reference coordinates stored in the storage means;

operate bend data indicating a bend from a direction of a rotation center axis of the crankshaft from a position of the plurality of journals estimated by the at least one processor; and operate twist data indicating a twist of the crankshaft from a position of the plurality of pins estimated by the at least one processor.

9. The crankshaft shape inspection system according to claim 8, wherein the at least one processor, which to each piece of three-dimensional information of a plurality of journals and a plurality of pins the position of which is estimated, subjects a columnar shape having corresponding length and diameter to fitting;

the at least one processor further configured to:

operate a center position of the columnar shape; and determine a center position of the columnar shape in each position of the plurality of journals and the plurality of pins.

10. The crankshaft shape inspection system according to claim 5, wherein the at least one processor is further configured to:

acquire a rigid transformation parameter including a position correction parameter which moves the partial shape and an inclination correction parameter which so as to correct an inclination of a partial shape of the crankshaft, rotates the partial shape, and combine the partial shape information and generates the crankshaft shape information after correcting a position and an inclination of the partial shape information by the rigid transformation parameter.

11. The crankshaft shape inspection system according to claim 10, wherein the position correction parameter and the inclination correction parameter are found by measuring a reference sample having true shape data with the plurality of shape measuring devices and superposing partial shape information of a measured reference sample on coordinates of true shape data.

12. A crankshaft shape inspection system having:

a support, including a base, which supports a crankshaft having a plurality of journals, a plurality of pins, and a plurality of counterweights disposed between the journals and the pins;

four or more shape measuring devices, each including a camera, which are disposed around the crankshaft supported by the support, are relatively movable in an axial direction of the crankshaft with respect to the crankshaft, and each acquire partial shape information indicating a partial shape of the crankshaft;

a storage which stores reference coordinate information indicating coordinates which are reference positions of the plurality of journals and the plurality of pins;

at least one processor configured to:

combine the partial shape information and generates crankshaft shape information indicating a three-dimensional shape of the crankshaft;

estimate each position of the plurality of journals and the plurality of pins in the crankshaft shape information by using the reference coordinates stored in the storage;

operate bend data indicating a bend from a direction of a rotation center axis of the crankshaft from a position of the plurality of journals; and operate twist data indicating a twist of the crankshaft from a position of the plurality of pins.

13. A crankshaft shape inspection method comprising:

relatively moving four or more shape measuring devices, each including a camera, disposed around a crankshaft having a plurality of journals, a plurality of pins, and a plurality of counterweights disposed between the journals and the pins in an axial direction of the crankshaft with respect to the crankshaft and acquiring partial shape information indicating a partial shape of the crankshaft;

combining the partial shape information and generating crankshaft shape information indicating a three-dimensional shape of the crankshaft;

estimating each position of the plurality of journals and the plurality of pins in shape information of the crankshaft by using reference coordinate information indicating coordinates which are reference positions of the plurality of journals and the plurality of pins;

operating bend data indicating a bend from a direction of a rotation center axis of the crankshaft from an estimated position of the plurality of journals; and operating twist data indicating a twist of the crankshaft from an estimated position of the plurality of pins.

* * * * *